United States Patent
Sun et al.

(10) Patent No.: US 12,019,345 B2
(45) Date of Patent: Jun. 25, 2024

(54) HIGH-CONTRAST FERROELECTRIC LIQUID CRYSTAL CELL

(71) Applicant: The Hong Kong University of Science and Technology, Kowloon (HK)

(72) Inventors: Zhibo Sun, New Territories (HK); Zhengnan Yuan, New Territories (HK); Abhishek Kumar Srivastava, Kowloon (HK); Hoi-Sing Kwok, New Territories (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 0 days.

(21) Appl. No.: 18/004,571

(22) PCT Filed: Sep. 10, 2021

(86) PCT No.: PCT/CN2021/117681
§ 371 (c)(1),
(2) Date: Jan. 6, 2023

(87) PCT Pub. No.: WO2022/057738
PCT Pub. Date: Mar. 24, 2022

(65) Prior Publication Data
US 2023/0244102 A1 Aug. 3, 2023

Related U.S. Application Data

(60) Provisional application No. 63/204,245, filed on Sep. 21, 2020.

(51) Int. Cl.
*G02F 1/1335* (2006.01)
*G02F 1/13363* (2006.01)
*G02F 1/141* (2006.01)

(52) U.S. Cl.
CPC ........ *G02F 1/141* (2013.01); *G02F 1/133541* (2021.01); *G02F 1/133638* (2021.01)

(58) Field of Classification Search
None
See application file for complete search history.

(56) References Cited

U.S. PATENT DOCUMENTS

| 4,367,924 A | 1/1983 | Clark et al. |
| 4,563,059 A | 1/1986 | Clark et al. |
| (Continued) | | |

FOREIGN PATENT DOCUMENTS

| CN | 108572487 A | 9/2018 |
| CN | 110308594 A | 10/2019 |
| (Continued) | | |

OTHER PUBLICATIONS

International Search Report and Written Opinion mailed Nov. 25, 2021 for PCT Application No. PCT/CN2021/117681, 7 pages.

(Continued)

*Primary Examiner* — Shan Liu
(74) *Attorney, Agent, or Firm* — Amin, Turocy & Watson, LLP

(57) ABSTRACT

One or more devices, systems, methods and/or apparatus to facilitate suppression of fringe field effect, such as for diffraction grating and/or display purposes. In one embodiment, a ferroelectric liquid crystal (FLC) element can comprise a pair of conductive substrates, a FLC layer having a helical pitch and positioned between the conductive substrates, one or more spacers fixedly positioned between the conductive substrates, and an alignment layer positioned between the FLC layer and one of the conductive substrates. The alignment layer can be disposed at least partially contiguous with the FLC layer. The FLC layer can comprise a chiral smectic C* liquid crystal layer having at least one of (Continued)

a helical pitch smaller than an average cell gap of the FLC layer, or an average helical pitch of the FLC layer being smaller than an average thickness of the FLC layer between the conductive substrates.

20 Claims, 17 Drawing Sheets

(56) References Cited

U.S. PATENT DOCUMENTS

| | | | |
|---|---|---|---|
| 4,634,228 A | | 1/1987 | Iwasaki et al. |
| 4,744,639 A | | 5/1988 | Tsuboyama |
| 4,792,211 A | | 12/1988 | Harada et al. |
| 4,796,979 A | | 1/1989 | Tsuboyama |
| 4,932,758 A | | 6/1990 | Hanyu et al. |
| 5,153,755 A | | 10/1992 | Higa |
| 5,165,076 A | | 11/1992 | Tsuboyama et al. |
| 5,223,963 A | | 6/1993 | Okada et al. |
| 5,285,304 A | | 2/1994 | Hotta et al. |
| 5,381,256 A | | 1/1995 | Hanyu et al. |
| 5,880,804 A | | 3/1999 | Yamaguchi et al. |
| 5,973,761 A | * | 10/1999 | Gofuku ............. G02F 1/133345 349/126 |
| 6,094,249 A | * | 7/2000 | Robinson .......... G02F 1/134309 349/147 |
| 6,184,967 B1 | | 2/2001 | Lagerwall et al. |
| 6,292,238 B1 | * | 9/2001 | Okada ............... G02F 1/133553 349/64 |
| 6,384,892 B1 | | 5/2002 | Johnson et al. |
| 6,671,028 B1 | * | 12/2003 | Beresnev ........... C09K 19/0225 349/173 |
| 6,774,963 B1 | * | 8/2004 | Nakao ............... G02F 1/133514 349/80 |
| 2004/0032560 A1 | * | 2/2004 | Washizawa ......... G02F 1/13392 349/155 |
| 2014/0313468 A1 | | 10/2014 | Fujisawa et al. |
| 2016/0187691 A1 | * | 6/2016 | Srivastava ........ G02F 1/133528 349/33 |
| 2018/0039009 A1 | | 2/2018 | Chong et al. |

FOREIGN PATENT DOCUMENTS

| | | | |
|---|---|---|---|
| JP | 2004-086116 A | | 3/2004 |
| JP | 2011-053523 A | | 3/2011 |
| JP | 2012-108249 A | | 6/2012 |
| JP | 2016024394 A | * | 2/2016 |

OTHER PUBLICATIONS

Mukherjee et al., "Fast Refocusing Lens Based on Ferroelectric Liquid Crystals", Optics Express, vol. 29, No. 6, Mar. 2021, 10 pages.

Sun et al., "Fringe Field Effect Free High-Resolution Display and Photonic Devices using Deformed Helix Ferroelectric Liquid Crystal", Liquid Crystals, vol. 48, No. 1, 2021, pp. 100-110.

Takahashi et al., "Preliminary Study of Field Sequential Fullcolor Liquid Crystal Display using Polymer Stabilized Ferroelectric Liquid Crystal Display", Japanese Journal of Applied Physics, vol. 38, 1999, pp. L534-L536.

Sheraw et al., "Organic Thin-Film Transistor-Driven Polymer-Dispersed Liquid Crystal Displays on Flexible Polymerio Substrates", Applied Physics Letters, vol. 80, No. 6, Feb. 11, 2002, pp. 1088-1090.

Beresnev et al., "Deformed Helix Ferroelectric Liquid Crystal Display: A New Electrooptic Mode in Ferroelectric Chiral Smectic C Liquid Crystals", Liquid Crystals, vol. 5, No. 4, 1989, pp. 1171-1177.

Won et al., "P-152 / High Resolution and Ultra—Fast Switching Liquid Crystal Device for Virtual Reality Display", SID Symposium Digest of Technical papers, 2019, 4 pages.

Guo et al., "Low Gamma Shift Blue-Phase Liquid Crystal Display with Electric Field Induced Multi-Domain Electrode Structure", Liquid Crystals, vol. 47, No. 1, 2020, pp. 54-66.

Sato et al., "High Quality Ferroelectric Liquid Crystal Display with Quasi-Bookshelf Layer Structure", Japanese Journal of Applied Physics, vol. 28, No. 3, Mar. 1989, pp. L483-L486.

Kim et al., "Photo Spacer Induced Bistable Mode Plastic PSFLCDs for High Mechanical Stability", IMID 05 Digest, 2005, pp. 489-492.

Sato et al., "27.4L: Late-News Paper: A New Mode LCD with Intrinsic Continuous Grayscale Memory using Ferroelectric Liquid Crystalline Polymer", In SID Symposium Digest of Technical Papers, 2010, pp. 394-396.

Srivastava et al., "Ferroelectric Liquid Crystals: Excellent Tool for Modern Displays and Photonics", Journal of the Society for Information Display, vol. 23, No. 6, 2015, pp. 253-272.

Myrvoid et al., "Epitaxial Growth Alignment of Ferroelectric Smectic C Phases on Rubbed Polymers", Liquid Crystals, vol. 3, No. 9, 1988, pp. 1255-1266.

Fujikake et al., "Rigid Formation of Aligned Polymer Fiber Network in Ferroelectric Liquid Crystal", Japanese Journal of Applied Physics, vol. 38, 1999, pp. 5212-5213.

Mikhailenko et al., "The Nano-Scale Pitch Ferroelectric Liquid Crystal Materials for Modern Display and Photonic Application Employing Highly Effective Chiral Components: Trifluoromethylalkyl Diesters of P-Terphenyldicarboxylic Acid", Journal of Molecular Liquids, vol. 281, 2019, pp. 186-195.

Ouchi et al., "Smectic Layer Structure of Thin Ferroelectric Liquid Crystal Cells Aligned by SiO Oblique Evaporation Technique", Japanese Journal of Applied Physics, 27(1IA), p. L1993.

* cited by examiner

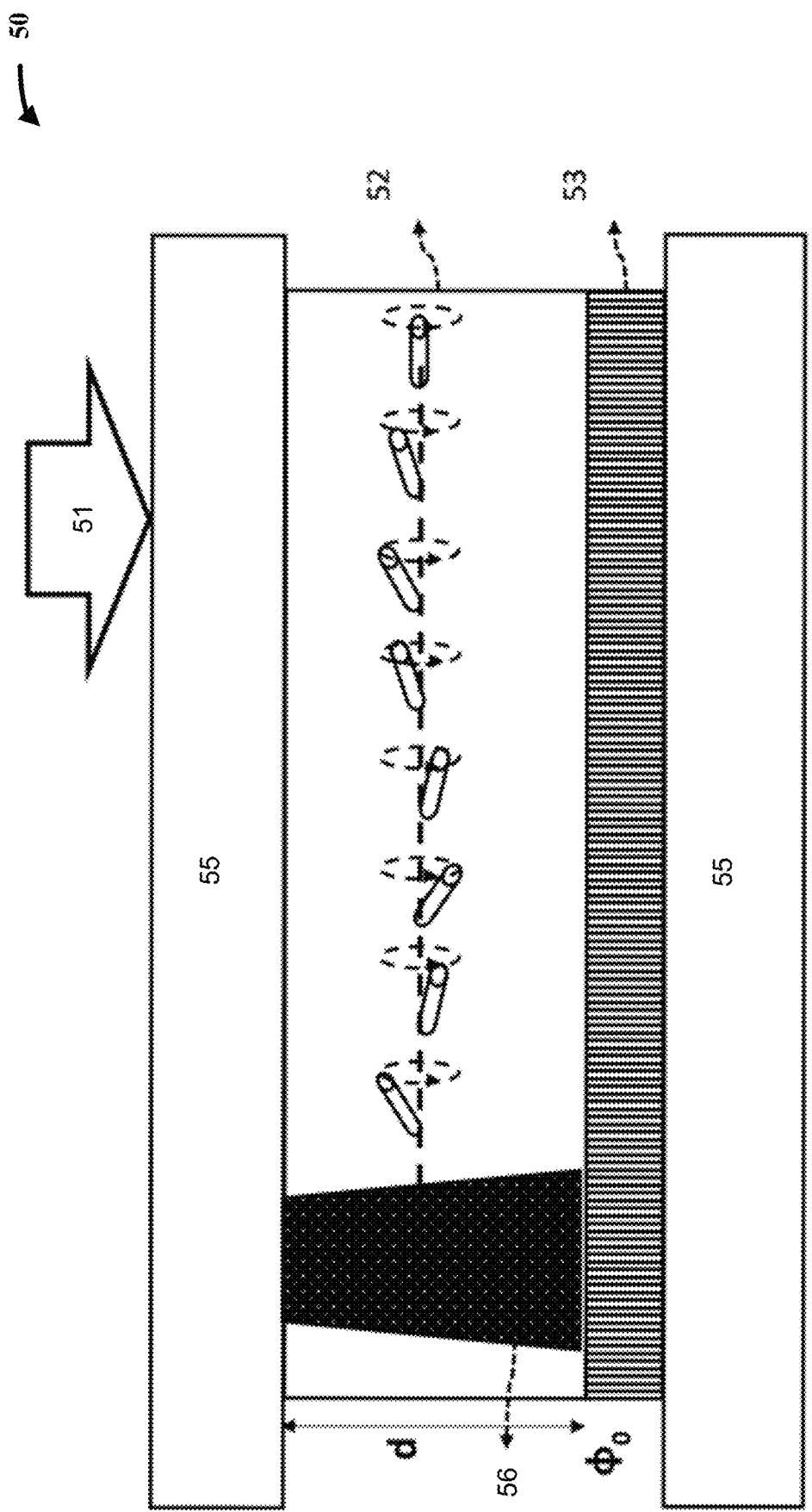

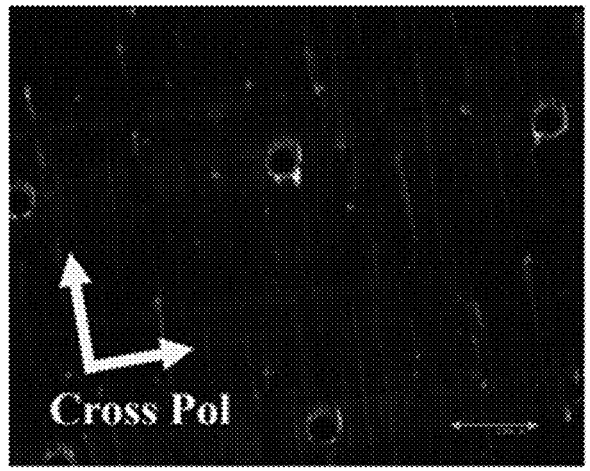
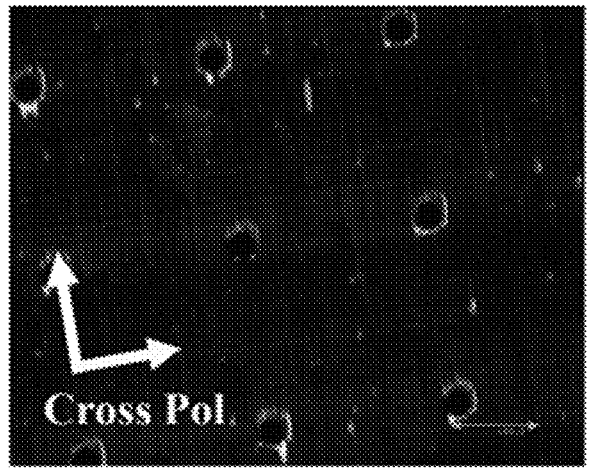
FIG. 7A FIG. 7B
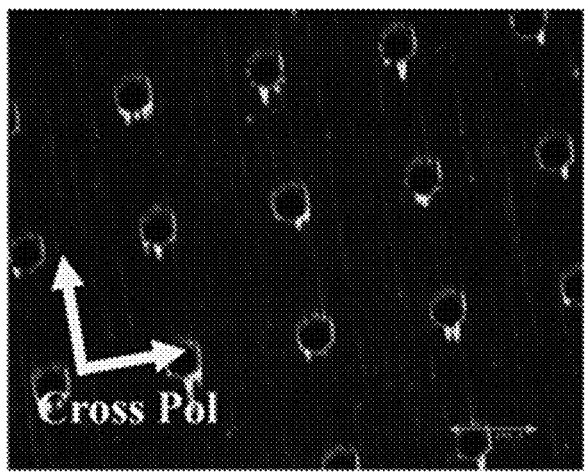
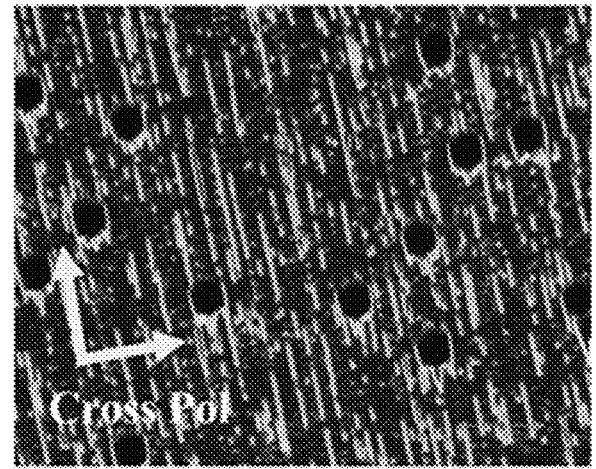
FIG. 7C FIG. 7D

HIGH-CONTRAST FERROELECTRIC LIQUID CRYSTAL CELL

RELATED APPLICATIONS

The subject patent application is a U.S. National Stage filing under 35 U.S.C. § 371 of international patent cooperation treaty (PCT) application No. PCT/CN2021/117681, filed Sep. 10, 2021, and entitled "HIGH-CONTRAST FERROELECTRIC LIQUID CRYSTAL CELL", which applications claim the benefit of priority from U.S. Provisional Patent Application No. 63/204,245, filed Sep. 21, 2020, and entitled "HIGH-CONTRAST DEFECT-FREE FERROELECTRIC LIQUID CRYSTAL CELL," the entireties of which priority applications are hereby incorporated by reference herein.

BACKGROUND

One or more embodiments described herein relate to a high-contrast ferroelectric liquid crystal cell, and, more specifically, to a ferroelectric liquid crystal cell that can suppress fringe field effect, such as for being employed for photonics and/or display purposes.

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later. In one or more embodiments described herein, devices, systems, methods and/or apparatuses are described that can facilitate suppression of fringe field effect relative to, for example, photonics and/or display purposes, via employing of a ferroelectric liquid crystal cell (also referred to herein as an element).

According to an embodiment, a ferroelectric liquid crystal element can comprise a pair of conductive substrates, a ferroelectric liquid crystal layer positioned between the conductive substrates and having a helical pitch, one or more spacers fixedly positioned between the conductive substrates, and an alignment layer positioned between the ferroelectric liquid crystal layer and one of the conductive substrates.

According to another embodiment, a method for producing a ferroelectric liquid crystal element can comprise positioning a pair of conductive substrates at opposing sides of a ferroelectric liquid crystal layer having a helical pitch, fixedly positioning one or more spacers between the conductive substrates, and positioning an alignment layer between the ferroelectric liquid crystal layer and one of the conductive substrates.

According to yet another embodiment, a method of using a ferroelectric liquid crystal element can comprise applying one or more driving voltages to a ferroelectric liquid crystal element, where the ferroelectric liquid crystal element comprises one or more spacers fixedly positioned between a pair of conductive substrates at opposing sides of a ferroelectric liquid crystal layer having a helical pitch, and an alignment layer between the ferroelectric liquid crystal layer and one of the conductive substrates. The method can further comprise modulating a transmittance associated with the ferroelectric liquid crystal element by applying as the one or more driving voltages first different voltages below a critical unwinding voltage associated with the ferroelectric liquid crystal element.

DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout.

FIG. 5 illustrates another exemplary diagram of another ferroelectric liquid crystal cell, in accordance with one or more embodiments described herein.

FIGS. 7A to 7D illustrate exemplary magnified views of three different embodiments of ferroelectric liquid crystal cells under cross polarizer, showing only an internal portion of the cells, including a ferroelectric liquid crystal layer and a plurality of spacers, in accordance with one or more embodiments described herein.

DETAILED DESCRIPTION

Figure 1:
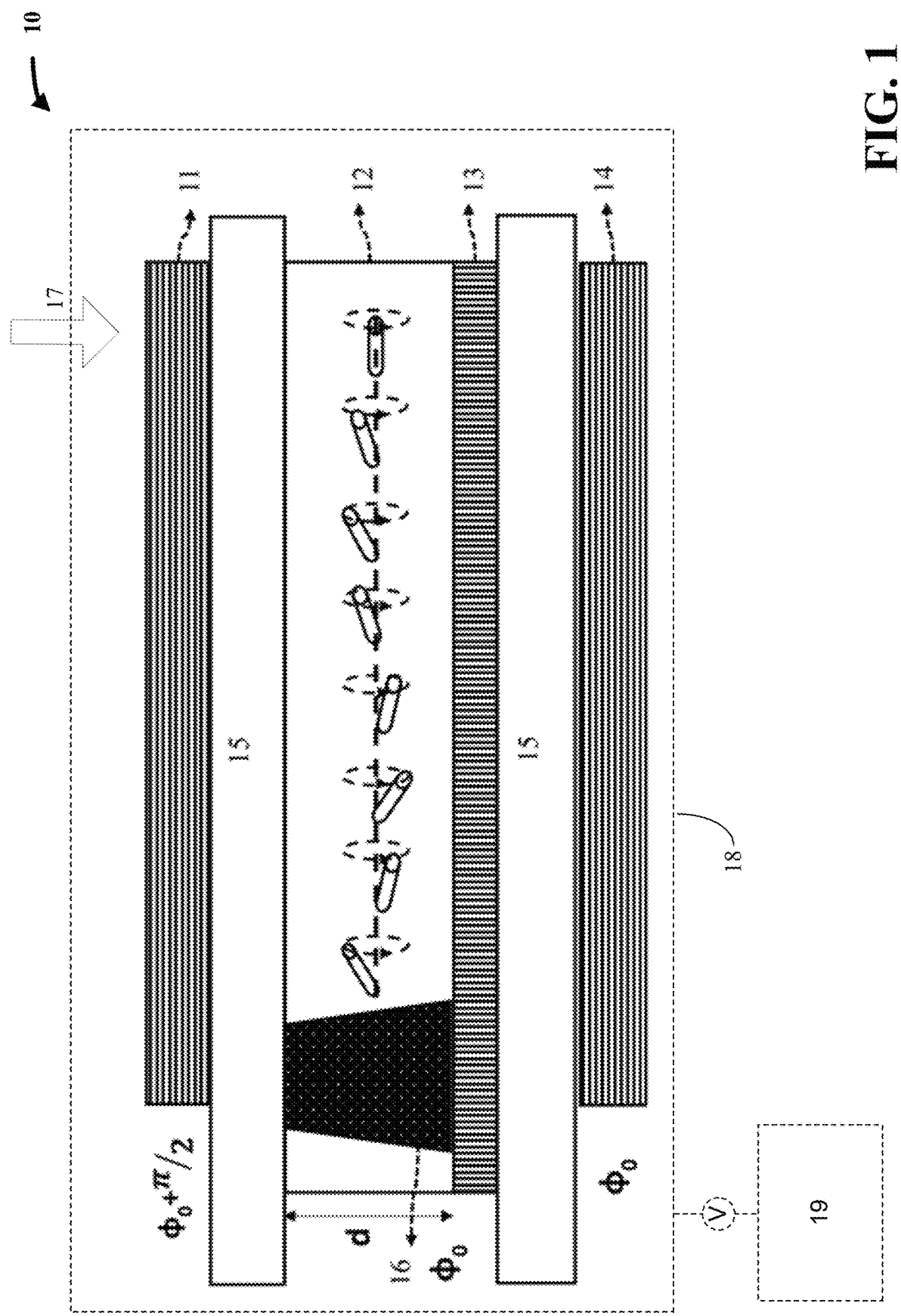
FIG. 1 illustrates an exemplary diagram of a ferroelectric liquid crystal cell, in accordance with one or more embodiments described herein. As provided in FIG. 1, $\phi 0$ is the direction of the polarizer on the bottom, the direction of the polarizer on the top is $\phi 0+(\Pi/2)$, and d is the thickness of the ferroelectric liquid crystal which can be in the a from about 0.1 μm to about 100 μm.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Overview

Today, optical elements, such as screens, mirrors, lenses, panels and/or AR/VR headsets and/or environments can be employed in a plurality of components, devices, systems and/or apparatuses for varying photonics and/or display purposes, which can include AR/VR application, in various fields, such as commercial, domestic and/or scientific. For such optical elements, liquid crystal can be widely employed as the spatial light modulator (SLM) for photonics and/or display uses. For example, SLMs such as liquid crystal on silicon or a passive material combined with an LC active part can be employed for visible light, infrared radiation and/or terahertz wavelengths.

With respect to such elements, fringe field effect (FFE), an increase of electric field due to discontinuity of material property, can cause issue performance of such displays. FFE can limit the employment of high pixel per inch counts in displays and photonic elements. While existing technologies have attempted to address this deficiency, these existing technologies have not succeeded.

For example, a conventional system has proposed a surface stabilized ferroelectric liquid crystal (SSFLC) device electro-optical mode showing bi-stability, where a ferroelectric liquid crystal showing a chiral smectic C phase (SmC*) or H phase (SmH*) of non-helical structure was employed. This conventional system may propose that under an electro-optical mode, molecules of the FLC can take on either of a first optically stable state or a second optically stable state responding to an electrical field applied thereto. The conventional system may propose that such a state can be maintained in the absence of an electrical field, namely bi-stability, and also can have a rapid response to a change in the electrical field applied. Yet, such a chiral smectic liquid crystal electro-optical device can encounter issues, such as occurrence of zigzag-shaped alignment defects leading to light leakage in the dark state and thus lowered contrast ratio and strong light diffraction are employed to counter such issues. The defects can be attributable to a layer structure of a chiral smectic liquid crystal including two types of chevron structures between a pair of substrates. It will be appreciated that employment of a liquid crystal layer having a bookshelf structure, where smectic layers are aligned substantially perpendicularly to substrates, can be employed to provide a liquid crystal device showing a higher contrast, comparatively.

Further, additional issues can limit use of a binary and/or bi-stable ferroelectric liquid crystal device based on SSFLC. These issues can include, without being limited to, high sensitivity to physical shock, non-uniformity of the display, diffraction and low contrast ratio. While existing technologies have attempted to address these deficiencies, such as to increase alignment quality of liquid crystal molecules and/or contrast ration of a resulting display, these existing technologies have not succeeded and/or have resulted in other issues.

For example, another conventional system has proposed that suitable alignment within the FLC can be obtained by applying a strong magnetic field or a shear stress. However, uniform alignment of liquid crystal molecules can be difficult to obtain for a cell comprising liquid crystal layers of several μm or below in thickness, even by applying a strong magnetic field. For another conventional system, a ferroelectric liquid crystal display device has been proposed employing a rubbed orientation control film of an organic polymer (PIQ; polyimidoisoindoloquinazolinedione, a product of Hitachi Chemical Co., Ltd.) to achieve uniform alignment. Such alignment process may be proposed as including converting the ferroelectric liquid crystal into an isotropic phase and, while applying a strong electric field, cooling slowly, such that the process is not preferable for mass production. For another conventional example, it has been proposed to employ an asymmetric alignment condition with the alignment treatment having uniaxial alignment characteristic to thereby arrange the ferroelectric liquid crystal molecules in a bi-stable state with high contrast. Such alignment may be proposed for application to one of the conductive substrates employed and random alignment treatment having non-alignment characteristic is proposed for application to the other conductive substrate employed. However, such applications may be proposed as being optimizing only for the bi-stable state, and the pitch of the FLC layer employed can be larger than a gap between the two conductive substrates, causing physical stacking issues and/or cell deformation.

In other examples, other properties of an alignment layer in such an FLC cell have been studied, including the conductivity, crystallinity, surface energy and/or different alignment material and different groups in the molecules of such alignment layer. For example, nylon 6.6 (polyhexamethyleneadipamide) may have been proposed as an alignment layer. In other examples, addressing the degree of crystallinity of the aligning polymer may have been proposed. For example, the influence of the degree of crystallization on the bi-stability of SSFLC samples can be studied without changing the polymer species in order to obtain quantitative results. For example, the degree of crystallization of nylon 6.6 layers can be varied and the electro-optical bi-stability of SSFLC samples, incorporating these alignment layers, can be investigated.

Nonetheless, such existing techniques can limit the optical performance and application, such as when the pitch decreases and/or the elastic energy increases in such FLC cells. For example, where fast binary switching is applied for a high-resolution display using a passive matrix, a low shock stability, diffraction due to the defects, temperature dependence and/or a multi-transistors pixel design using an active matrix for high resolution display, can limit a display employing such existing techniques. That is, such existing techniques do not address features of fast response at low voltage, high contrast ratio, small fringe field effect and/or continuous grayscale at different voltages. Additionally, although the FLC in a polymer fiber network may be proposed as achieving fast response and continuous grayscale, the deformation of the smectic layer resulting from the polymer wall curvature can limit the contrast ratio and driving voltage in practical displays.

Additionally, a DHFLC using a short pitch FLC that is smaller than the cell gap also may be proposed as showing the continuous grayscale and fast response at low voltage. Nevertheless, because of the small pitch and strong corresponding elastic energy, the difficulty in achieving good alignment quality and high contrast ratio can be even greater than previous examples. Further, by employing spacers in between conductive substrates, the cell gap of the FLC may be proposed as being controlled. However, because of the high viscosity of the FLC, the spacers can be pushed and flow together with the FLC, which can alter the distribution of the spacers, such as during use. Non-uniform distribution of the spacers can distort the pitch and induce defects. Under the interaction between FLC molecules due to high elastic energy, uniformity and/or contrast ratio can be degraded, as a result. Additionally, defects induced in the planar aligned FLC cells, such as ferroelectric domain and/or elastic domain, can result in the scattering of the input light causing the light efficiency and/or contrast ratio to drop. Further, it may be proposed that in-plane electric field resulting in disclination lines in nematic liquid crystal does not influence an FLC since the spontaneous polarization is not perpendicular to the in-plane electric field.

To address one or more of the aforementioned deficiencies of existing techniques, one or more embodiments are described herein that can provide one or more devices, systems, methods and/or apparatuses. The one or more embodiments described can employ a ferroelectric liquid crystal (FLC) layer with suitable molecular alignment quality and uniformity, such as by employing an alignment layer on only one side of a conductive substrate and by employing fixed spacers. A helical FLC layer, such as a deformed helical FLC layer can be employed.

The fixed spacers can be employed with optimized size and mutual space therebetween, generally within the FLC layer, to thereby maintain a uniform thickness of the FLC between a pair of conductive substrates. As described herein, regular and/or irregular spacing of fixed spacers can be employed. Fixing of the spacers can limit and/or prevent movement of spacing distance between the spacers during use of a resultant device employing such an FLC cell, also referred to herein as an element. As a result, an FLC element with high contrast ratio, suitable FLC molecular alignment and optical efficiency can be achieved, such as with minimal or no defects being produced.

During use of the FLC element, transmittance can be modulated, such as continuously, by applying one or more voltages below a critical unwinding voltage of the FLC layer. As used herein, a critical unwinding voltage is the voltage when deformed helix ferroelectric liquid crystal unwinds. It can also be called as unwinding voltage. The deformed helix ferroelectric liquid crystal is used from 0V to the critical unwinding voltage. Accordingly, an electric suppressed helix ferroelectric liquid crystal element providing high contrast ratio and optical efficiency can be achieved. Additionally and/or alternatively, binary switching can be achieved by applying one or more voltages, such as continuously, that are larger than the critical unwinding voltage.

In summary, the one or more embodiments of an FLC element described herein can provide one or more of high optical contrast, minimal or no fringe field, fast response, low driving voltages, minimal or no intrinsic diffraction and/or ease of fabrication. Further, the one or more embodiments of an FLC element described herein can provide good physical shock susceptibility in view of employing fixed spacers and thus the FLC element having high elastic energy. Moreover, when employing a wave plate, such as a quarter-wave plate or a half-wave plate with and/or as part of an FLC element in accordance with one or more embodiments described herein, a continuous phase modulation can be achieved. As such, the one or more embodiments of an FLC element described herein can be suitable for employment in high-resolution display and/or photonics devices, systems, methods and/or apparatuses, such as for devices, systems and/or apparatuses, and or methods relative to, small size, such as cell phones, tablets, watches and/or other small products and or small displays in larger products. Other applications can include, without being limited to, VR/AR devices and/or environments, diffraction grating devices and/or optical sensors.

Example Embodiments

One or more embodiments are now described with reference to the drawings, where like referenced numerals are used to refer to like elements throughout. As used herein, both above and below, the term "entity" can refer to a machine, device, smart device, component, hardware, software and/or human. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, one or more devices, systems and/or apparatuses thereof can further comprise one or more computer and/or computing-based elements described herein with reference to an operating environment, such as the operating environment 1800 illustrated at FIG. 18. In one or more described embodiments, computer and/or computing-based elements can be used in connection with implementing one or more of the systems, devices, apparatuses and/or computer-implemented operations shown and/or described in connection with one or more figures described herein.

Generally, a ferroelectric liquid crystal (FLC) element, for facilitating suppression of fringe field effect, and such as for use in a photonics and/or other display application, can comprise an FLC layer, a pair of conductive substrates, one or more spacers and an alignment layer. The FLC layer can have a helical pitch, such as a deformed helical pitch, and can be positioned between the pair of conductive substrates. The one or more spacers can also be positioned between the pair of conductive substrates. For example, one or more spacers can be at least partially contiguous with, such as at least partially radially surrounded by, portions of the FLC layer. The alignment layer can be positioned between the FLC layer and one of the conductive substrates, and thus also be positioned between the conductive substrates.

It will be appreciated that such FLC element can be employed for any other suitable purpose related to or not related to photonics and/or high pixel count/high resolution display.

Turning first to FIG. 1, an exemplary diagram of a ferroelectric liquid crystal cell, also herein referred to as an element, is illustrated, in accordance with one or more embodiments described herein. The FLC element 10 can be employed for facilitating suppression of fringe field effect, and as such, for use in a photonics and/or other display application. The FLC element 10 can comprise an FLC layer 12, a pair of conductive substrates 15, one or more spacers 16 and an alignment layer 13. The FLC layer 12 can have a helical pitch, such as a deformed helical pitch, and can be positioned between the pair of conductive substrates 15. The one or more spacers 16 can also be positioned between the pair of conductive substrates 15, as illustrated. For example, one or more spacers 16 can be at least partially contiguous with, such as at least partially radially surrounded by, portions of the FLC layer 12. The alignment layer 13 can be positioned between the FLC layer 12 and one of the conductive substrates 15, and thus also be positioned between the conductive substrates 15.

The ferroelectric liquid crystal layer 12 can comprise a chiral smectic C* liquid crystal layer. In one or more embodiments, the FLC layer 12 can have a helical (also referred to herein as helix) pitch smaller than an average cell gap of the FLC layer 12. Additionally or alternatively, an average helical pitch of the FLC layer 12 can be smaller than an average thickness of the FLC layer 12 between the conductive substrates 15.

For example, the FLC layer 12 can be employ deformed helix ferroelectric liquid crystals with helix pitch at or smaller than about 300 nm, which can be smaller than a thickness of the FLC layer 12 between the conductive substrates 15. The thickness of the FLC layer 12 can be in a range from about 0.1 μm to about 100 μm, such as about 1.5 μm or about 3.0 μm. Additionally and/or alternatively, electrically suppressed helix ferroelectric liquid crystals with helix pitch ranged from about 300 nm to about 2 μm, or of an average of about 300 nm, or of an average of about 2 μm, can be employed, which can be smaller than the thickness of the FLC layer 12 between the conductive substrates 15.

Turning now to the alignment layer, as shown, the alignment layer 13 can be positioned at only one side of one conductive substrate 15, such as at an inner side of a conductive substrate 15 facing the FLC layer 12. In one or more embodiments, the alignment layer 13 can be disposed at least partially contiguous with the FLC layer 12. The alignment layer 13 can be a coating applied to a conductive substrate 15 or to another element of an FLC element, such as a wave plate as described below relative to FIGS. 2 to 5. The alignment layer 13 can be formed by any suitable technique, such as by a photoalignment technique or rubbed polyimide technique or evaporated SiO technique. The alignment layer 13 can be composed of SD1, DMF (dimethylformamide) and/or $N_6$ (nylon 6,6; polyhexamethyleneadipamide), for example. The alignment layer can have a thickness of about 5 nm to about 200 nm, such as about 100 nm.

Turning now to FIGS. 8A-8C, 9A-9C and 12A-12C, it will be appreciated that concentration and type of material used for alignment layer, employment of single or double alignment layer, whether a FLC layer includes deformed helical and/or electrically suppressed helical ferroelectric crystals, and/or different modes of FLC layers with various helical pitch employed can affect and/or influence contrast ratio and/or efficiency of a display and/or photonics device employing an FLC cell comprising such properties. It also will be appreciated that the understandings provided by and/or described relative to any of FIGS. 8A-C, 9A-9C and/or 12A-12C can be applied to the FLC element of FIG. 1 and/or to the FLC elements of any of FIGS. 2-5.

Figure 2:
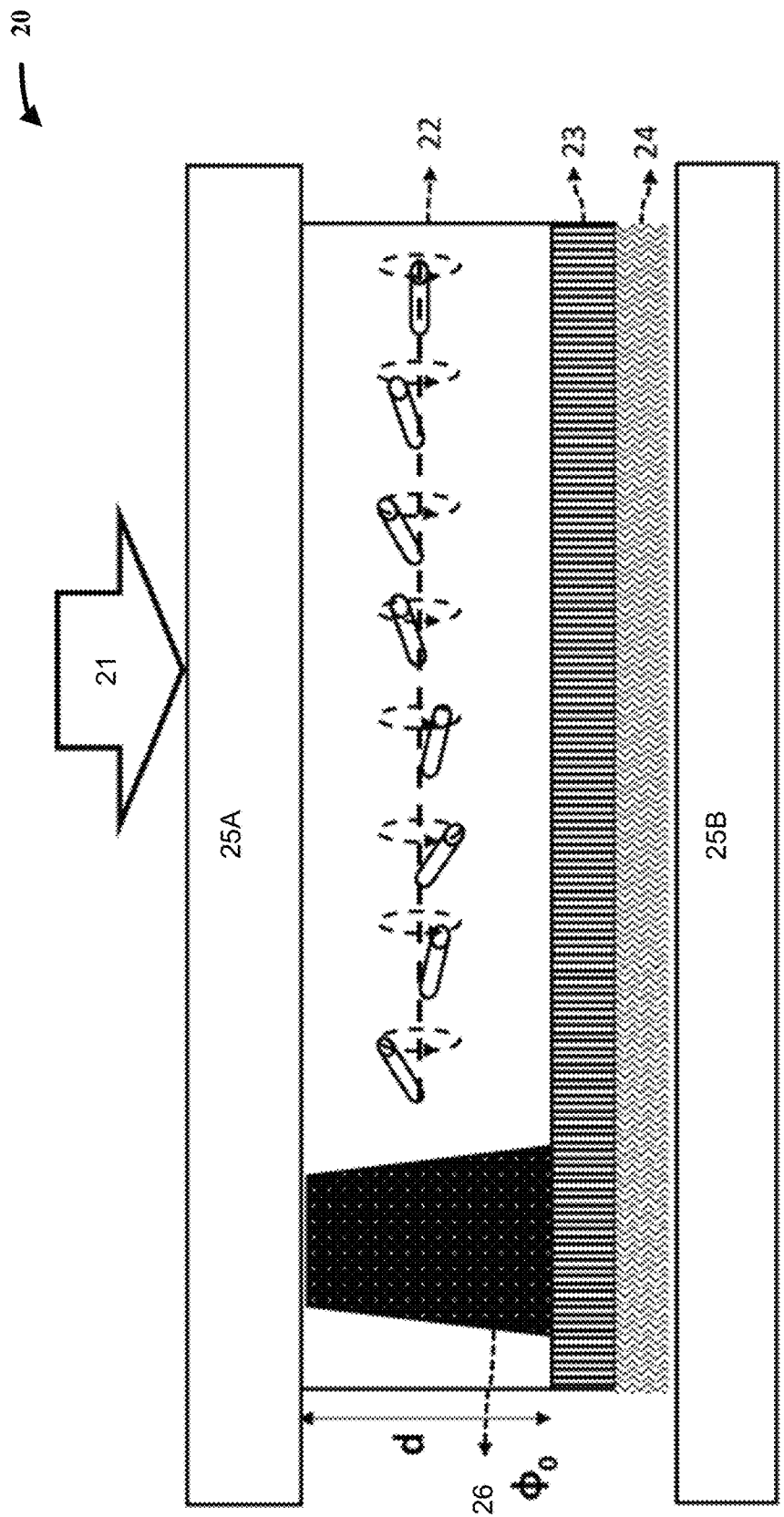
FIG. 2 illustrates an exemplary diagram of another ferroelectric liquid crystal cell, in accordance with one or more embodiments described herein.
Figure 3:
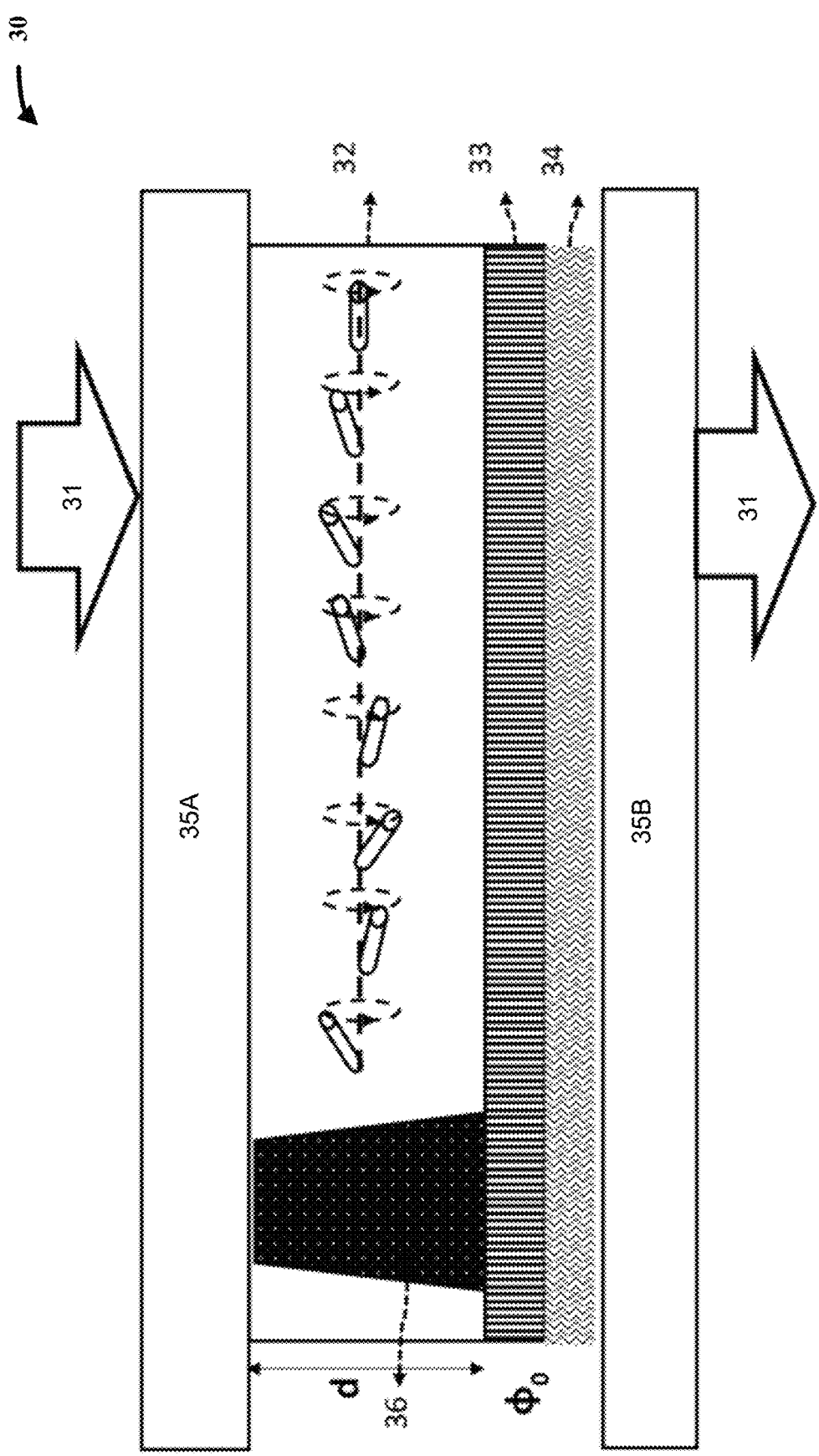
FIG. 3 illustrates an exemplary diagram of still another ferroelectric liquid crystal cell, in accordance with one or more embodiments described herein.
Figure 4:
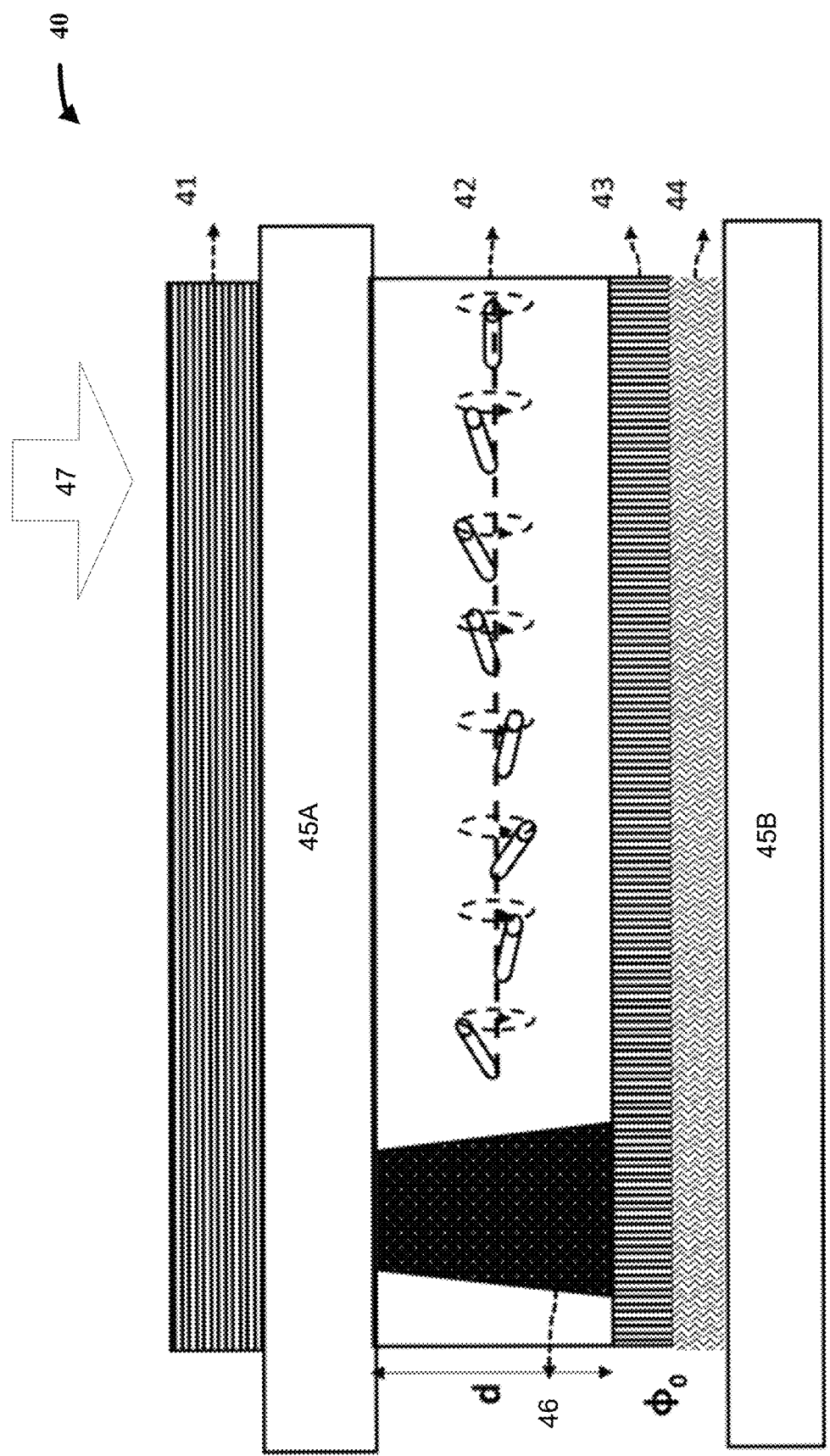
FIG. 4 illustrates an exemplary diagram of yet another ferroelectric liquid crystal cell, in accordance with one or more embodiments described herein.

As used herein, although not specifically illustrated in the FIGS. 1-5, a second alignment layer (e.g., providing the "double-side alignment") can be arranged at FIG. 1 between the FLC layer 12 and the conductive substrate 15, at FIG. 2 between the FLC layer 22 and the conductive substrate 25A, at FIG. 3 between the FLC layer 32 and the conductive substrate 35A, at FIG. 4 between the FLC layer 42 and the conductive substrate 45A, or at FIG. 5 between the FLC layer 52 and the upper conductive substrate 55. That is, the second alignment layer can respectively be applied to the conductive substrate 15, 25A, 35A, 45A or upper 55, such as by any suitable method, such as described above with respect to the alignment layer 13.

Figures 8A, 8B, 8C:
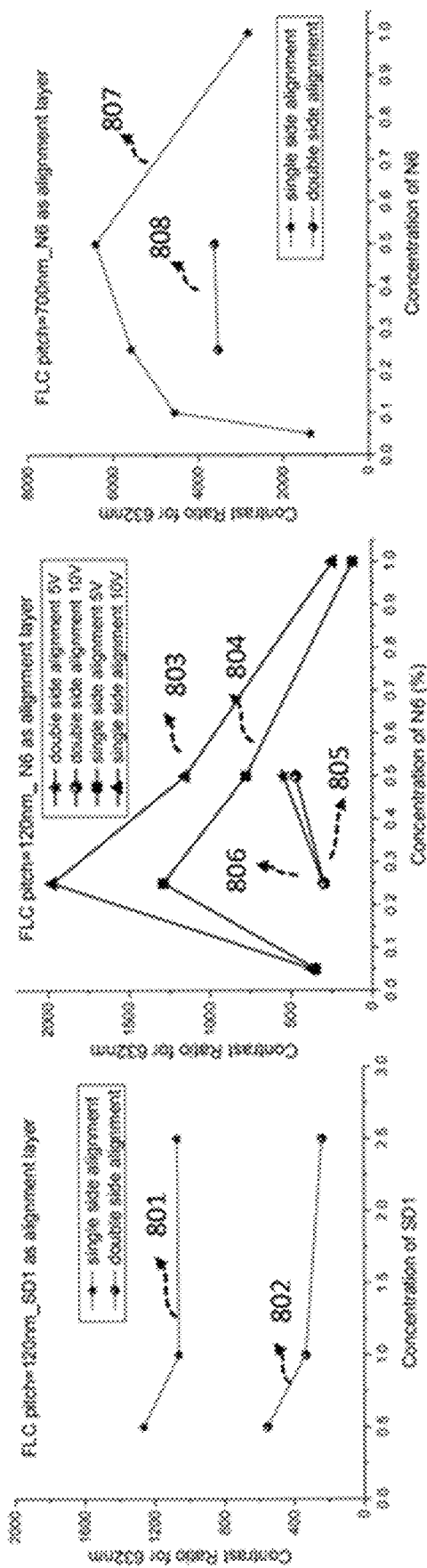
FIG. 8A illustrates a graph of a corresponding relationship of contrast ratio to alignment layer material concentration for a deformed helix ferroelectric liquid crystal (DHFLC) cell at 632 nm wavelength and for varying material concentration for the alignment layer, in accordance with one or more embodiments described herein. The material for the alignment layer employed is SD1 and the pitch of ferroelectric liquid crystal employed is 120 nm. The performance for employment of a single-side alignment layer (801) and for employment of a double-side alignment layer (802) are compared.
FIG. 8B illustrates a graph of a corresponding relationship of contrast ratio to alignment layer material concentration for a DHFLC cell at 632 nm wavelength and for varying material concentration for the alignment layer at two driving voltages, in accordance with one or more embodiments described herein. The material for the alignment layer employed is $N_6$ and the pitch of the ferroelectric liquid crystal employed is 120 nm. The performance for employment of a single-side alignment layer driven at 5 V (804) and at 10 V (803) and for employment of a double-side alignment layer driven at 5 V (805) and at 10 V (806) are compared.
FIG. 8C illustrates a graph of a corresponding relationship of contrast ratio to alignment layer material concentration for an electrically suppressed helix ferroelectric liquid crystal (ESHFLC) cell at 632 nm wavelength and for varying material concentration for the alignment layer, in accordance with one or more embodiments described herein. The material employed for alignment layer is $N_6$ and the pitch of the ferroelectric liquid crystal employed is 700 nm. The performance for employment of a single-side alignment layer (807) and for employment of a double-side alignment layer (808) are compared.

The influence on contrast ratio of type of alignment layer material for both single-side and double-side alignment FLC cells with 120 nm or 700 nm pitch are shown in FIGS. 8A-8C.

When there are double alignment layers, the second alignment layer will be arranged in between the 12 and 15 in FIG. 1, 22 and 25A in FIG. 2, 32 and 35A in FIG. 3, 42 and 45a in FIG. 4, 52 and 55 in FIG. 5.

FIG. 8A illustrates a graph of a corresponding relationship of contrast ratio to alignment layer material concentration for a DHFLC cell at 632 nm wavelength and for varying material concentration for the alignment layer, in accordance with one or more embodiments described herein. The material for the alignment layer employed is SD1 and the pitch of ferroelectric liquid crystal employed is 120 nm. The performance for employment of a single-side alignment layer (801) and for employment of a double-side alignment layer (802) are compared.

FIG. 8B illustrates a graph of a corresponding relationship of contrast ratio to alignment layer material concentration for a DHFLC cell at 632 nm wavelength and for varying material concentration for the alignment layer at two driving voltages, in accordance with one or more embodiments described herein. The material for the alignment layer employed is $N_6$ and the pitch of the ferroelectric liquid crystal employed is 120 nm. The performance for employment of a single-side alignment layer driven at 5 V (804) and at 10 V (803) and for employment of a double-side alignment layer driven at 5 V (805) and at 10 V (806) are compared.

FIG. 8C illustrates a graph of a corresponding relationship of contrast ratio to alignment layer material concentration for an ESHFLC cell at 632 nm wavelength and for varying material concentration for the alignment layer, in accordance with one or more embodiments described herein. The material employed for alignment layer is $N_6$ and the pitch of the ferroelectric liquid crystal employed is 700 nm. The performance for employment of a single-side alignment layer (807) and for employment of a double-side alignment layer (808) are compared.

In summary, as shown at FIGS. 8A-8C, single-side alignment shows higher contrast ratio (e.g., 801 and/or 803) than double-side alignment for ferroelectric liquid crystal with 120 nm pitch, regardless of whether material SD1 or $N_6$ are utilized as the alignment material at different concentration(s). Further, 0.25% $N_6$ single-side alignment shows a highest contrast ratio (e.g., 803) driven at 10 V. Also, for ferroelectric liquid crystal with 700 nm pitch, 0.5% $N_6$ single-side alignment shows a highest contrast ratio (e.g., 807).

Figures 12A, 12B, 12C:
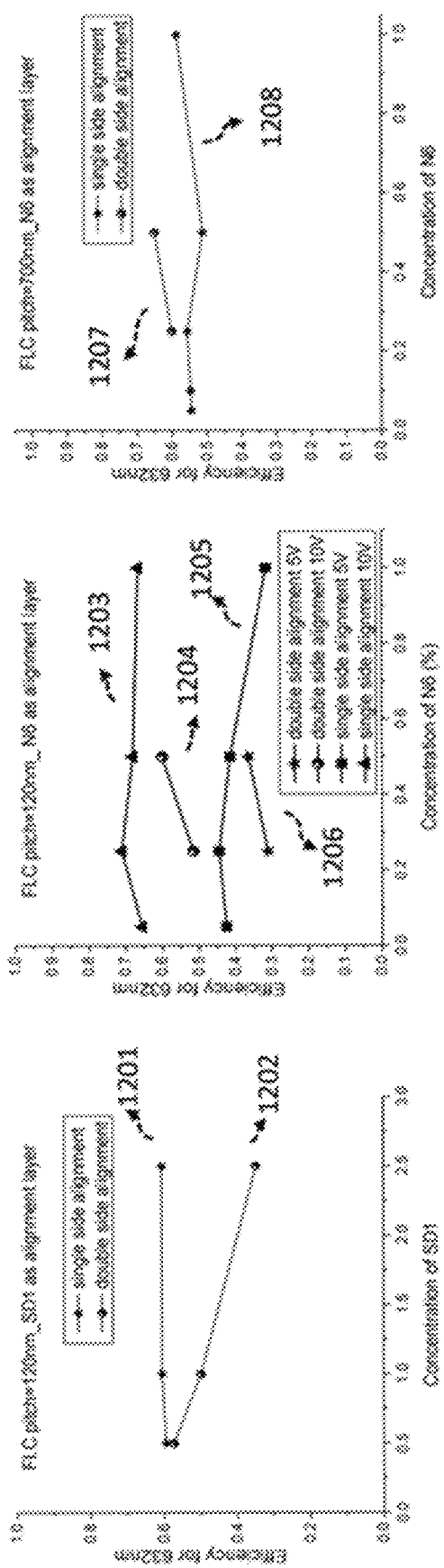
FIG. 12A illustrates a graph of a corresponding relationship of efficiency to alignment layer material concentration for a DHFLC cell at 632 nm wavelength and for varying material concentration for the alignment layer, in accordance with one or more embodiments described herein. Efficiency can be defined as a ratio between an intensity ratio of a maximum transmittance of a respective ferroelectric liquid crystal of the DHFLC cell and a transmittance absent the ferroelectric liquid crystal (e.g., having only parallel polarizers). The material for alignment layer is SD1 and the pitch of ferroelectric liquid crystal is 120 nm. The performance for employment of a single-side alignment layer (1201) and for employment of a double-side alignment layer (1202) are compared.
FIG. 12B illustrates a graph illustrating the corresponding relationship of efficiency to alignment layer material concentration for DHFLC cell at 632 nm wavelength and for varying material concentration for the alignment layer at two driving voltages, in accordance with one or more embodiments described herein. The material for the alignment layer employed is $N_6$ and the pitch of the ferroelectric liquid crystal employed is 120 nm. The performance for employment of a single-side alignment layer driven at 5 V (1205) and at 10 V (1203) and for employment of double-side alignment layer driven at 5 V (1206) and at 10 V (1204) are compared.
FIG. 12C illustrates a graph illustrating the corresponding relationship of efficiency to alignment layer material concentration for ESHFLC cell at 632 nm wavelength and for varying material concentration for the alignment layer, in accordance with one or more embodiments described herein. The material for the alignment layer employed is $N_6$ and the pitch of the ferroelectric liquid crystal employed is 700 nm. The performance for employment of a single-side alignment layer (1208) and for employment of double-side alignment layer (1207) are compared.

The influence on efficiency of type of alignment layer material for both single-side and double-side alignment ferroelectric liquid crystal cell with 120 nm or 700 nm pitch are shown in FIGS. 12A-12C.

FIG. 12A illustrates a graph of a corresponding relationship of efficiency to alignment layer material concentration for a DHFLC cell at 632 nm wavelength and for varying material concentration for the alignment layer, in accordance with one or more embodiments described herein. Efficiency can be defined as a ratio between an intensity ratio of a maximum transmittance of a respective ferroelectric liquid crystal of the DHFLC cell and a transmittance absent the ferroelectric liquid crystal (e.g., having only parallel polarizers). The material for alignment layer is SD1 and the pitch of ferroelectric liquid crystal is 120 nm. The performance for employment of a single-side alignment layer (1201) and for employment of a double-side alignment layer (1202) are compared.

FIG. 12B illustrates a graph illustrating the corresponding relationship of efficiency to alignment layer material concentration for DHFLC cell at 632 nm wavelength and for varying material concentration for the alignment layer at two driving voltages, in accordance with one or more embodiments described herein. The material for the alignment layer employed is $N_6$ and the pitch of the ferroelectric liquid crystal employed is 120 nm. The performance for employment of a single-side alignment layer driven at 5 V (1205) and at 10 V (1203) and for employment of double-side alignment layer driven at 5 V (1206) and at 10 V (1204) are compared.

FIG. 12C illustrates a graph illustrating the corresponding relationship of efficiency to alignment layer material concentration for ESHFLC cell at 632 nm wavelength and for varying material concentration for the alignment layer, in accordance with one or more embodiments described herein. The material for the alignment layer employed is $N_6$ and the pitch of the ferroelectric liquid crystal employed is 700 nm. The performance for employment of a single-side alignment layer (1208) and for employment of double-side alignment layer (1207) are compared.

In summary, as shown at FIGS. 12A-12C, single-side alignment shows higher efficiency (e.g., 1201 and/or 1203) than double-side alignment for ferroelectric liquid crystal with 120 nm pitch, regardless of whether material SD1 or $N_6$ are utilized as the alignment material at different concentration(s). Further, single-side alignment shows a high efficiency (e.g., 1203) driven at 10 V. Also, for ferroelectric liquid crystal with 700 nm pitch, single-side alignment shows a highest contrast ratio (e.g., 1207).

Figures 9A, 9B, 9C:
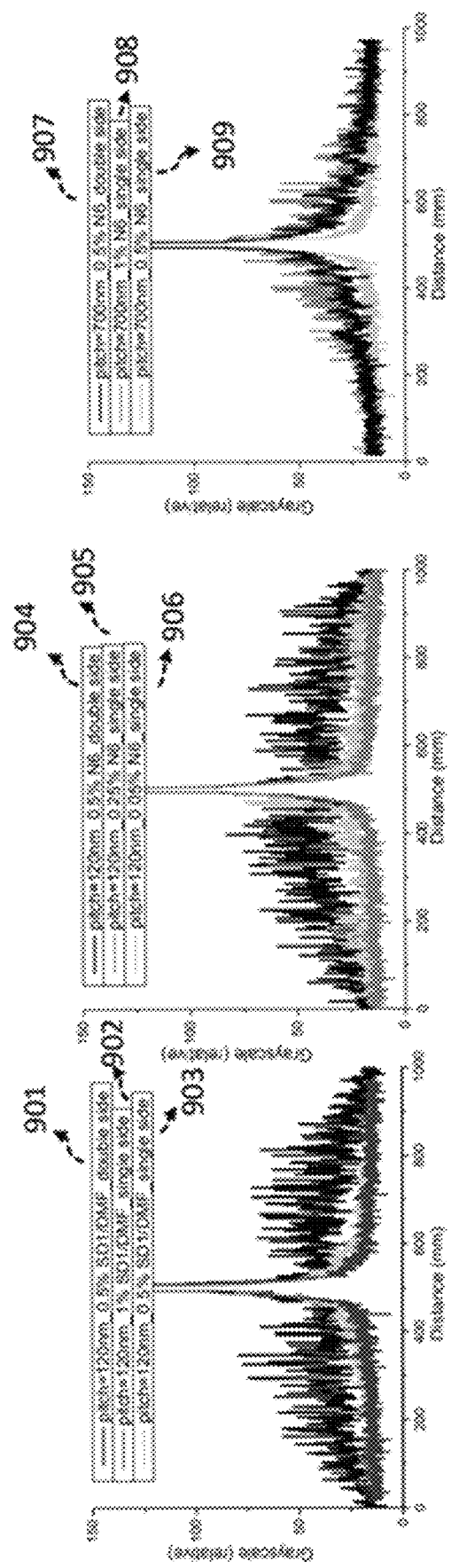
FIG. 9A illustrates a graph of the diffraction of a DHFLC cell, in accordance with one or more embodiments described herein, graphing relative grayscale against distance. The distance is defined by the difference in the position from the left edge of the diffraction profile. The material for the alignment layer employed is SD1 and the pitch of the ferroelectric liquid crystal employed is 120 nm. The performance for employment of a double-side alignment layer with 0.5% SD1/DMF (901) and for employment of a single-side alignment layer with 0.5% SD1/DMF (903) and with 1% SD1/DMF (902) are compared.
FIG. 9B illustrates a graph of the diffraction of a DHFLC cell, in accordance with one or more embodiments described herein, graphing relative grayscale against distance. The material for the alignment layer employed is $N_6$ and the pitch of the ferroelectric liquid crystal employed is 120 nm. The performance for employment of a double-side alignment layer with 0.5% $N_6$ (904) and for employment of a single-side alignment layer with 0.25% $N_6$ (905) and with 0.05% $N_6$ (906) are compared.
FIG. 9C illustrates a graph of the diffraction of an ESHFLC cell, in accordance with one or more embodiments described herein, graphing relative grayscale against distance. The material for the alignment layer employed is $N_6$ and the pitch of the ferroelectric liquid crystal employed is 700 nm. The performance for employment of a double-side alignment layer with 0.5% $N_6$ (907) and for employment of a single-side alignment layer with 0.5% $N_6$ (909) and with 1% $N_6$ (908) are compared.

The influence on contrast ratio of concentration and type of material for both single-side and double-side alignment ferroelectric liquid crystal cell with 120 nm or 700 nm pitch are shown in FIGS. 9A-9C.

FIG. 9A illustrates a graph of the diffraction of a DHFLC cell, in accordance with one or more embodiments described herein, graphing relative grayscale against distance. The distance is defined by the difference in the position from the left edge of the diffraction profile. The material for the alignment layer employed is SD1 and the pitch of the ferroelectric liquid crystal employed is 120 nm. The performance for employment of a double-side alignment layer with 0.5% SD1/DMF (901) and for employment of a single-side alignment layer with 0.5% SD1/DMF (903) and with 1% SD1/DMF (902) are compared.

FIG. 9B illustrates a graph of the diffraction of a DHFLC cell, in accordance with one or more embodiments described herein, graphing relative grayscale against distance. The material for the alignment layer employed is $N_6$ and the pitch of the ferroelectric liquid crystal employed is 120 nm. The performance for employment of a double-side alignment layer with 0.5% $N_6$ (904) and for employment of a single-side alignment layer with 0.25% $N_6$ (905) and with 0.05% $N_6$ (906) are compared.

FIG. 9C illustrates a graph of the diffraction of an ESHFLC cell, in accordance with one or more embodiments described herein, graphing relative grayscale against distance. The material for the alignment layer employed is $N_6$ and the pitch of the ferroelectric liquid crystal employed is 700 nm. The performance for employment of a double-side alignment layer with 0.5% $N_6$ (907) and for employment of a single-side alignment layer with 0.5% $N_6$ (909) and with 1% $N_6$ (908) are compared.

In summary, as shown in all three FIGS. 9A-9C, a defect can be better (e.g., less) for single-side alignment (e.g., 902, 903, 905, 906, 908 and/or 909) Additionally, a defect can be further reduced for concentration of alignment layer material combined with ferroelectric liquid crystal with 120 nm pitch (e.g., 905) and with ferroelectric liquid crystal with 700 nm pitch (e.g., 909).

Turning now again to FIG. 1, the one or more spacers 16 at FIG. 1 can facilitate maintaining cell gap between the conductive substrates 15, such as during use of the FLC element 10, such as when a voltage is applied to the FLC element 10, and thus to the FLC layer 12. That is, the one or more spacers 16 can facilitate maintaining a uniform thickness of the FLC layer 12, and/or a thickness of the FLC layer 12 within a selectively defined range, between the conductive substrates 15.

This maintenance of cell gap can be provided by fixedly positioning the one or more spacers 16 between the conductive substrates 15. As shown, the one or more spacers 16 can be disposed within and/or contiguous with the FLC layer 12, such as being surrounded by the FLC layer 12 (e.g., in a dimension between the conductive substrates 15). Fixation relative to one or more of the conductive substrates 15 and/or relative to an alignment layer, such as the alignment layer 13, can be facilitated via any one or more of adhesive, chemical bonding or molding technique, such as patterned photo resist and/or Si oxide material. In one or more embodiments, such fixing and/or bonding can be achieved by patterning photoresist after spin-coating the photoresist on a layer of a cell, such as on a conductive substrate 15 and/or alignment layer 13. One or more spacers 16 can employ one or more different methods of fixation relative to one or more of the conductive substrates 15 and/or relative to an alignment layer, such as the alignment layer 13.

It will be appreciated that the spacers can have the same and or different shapes. A spacer 16 can have a cylindrical shape, conical shape, frusto-conical shape, pyramidal shape, frusto-pyramidal shape and/or any other suitable shape. Alignment of the shape can be varied between the conductive substrates 15, where suitable. As illustrated at FIG. 1, the employed spacer 16 has a frusto-conical shape with opposite faces, such as planar faces, facing the conductive substrates 15.

Regarding spacer material, it will be appreciated that any one or more suitable materials can be employed, such as a suitable photoresist and/or a suitable polymer. Spacers employed can all be of a same material or of different materials. A spacer can include a combination of one or more suitable materials.

The density, size and/or arrangement of the fixed spacers 16 can be controlled, such as to optimize optical performance and/or alignment quality of the FLC element. For example, arrangement of the spacers 16 relative to one another can be regular (e.g., uniform distancing) and/or irregular (e.g., not all uniform distancing). In an embodiment, arrangement of a plurality of spacers 16 can employ uniform distancing relative to one another between the conductive substrates 15, with an average distance between spacers 16 being larger than about 50 μm, such as in a range of about 50 μm to about 200 μm, such as about 150 μm, or of about 100 μm, or of about 50 μm. Additionally and/or alternatively, the one or more spacers 16 can have respective densities at or below about 100 mm$^2$ or at or below about 80 mm$^2$. Additionally and/or alternatively, the one or more spacers 16 can have an average width in a range below about 20 μm. Additionally and/or alternatively the one or more spacers 16 can have a thickness (e.g., height) between the conductive substrates 15 below about 100 μm, although this can be dependent about a thickness of the FLC layer 12.

Turning briefly to FIGS. 6A-6C and 7A-7D, illustrated are exemplary polarizer optical diagrams, of magnified views, of various spacer 16 arrangements, in accordance with one or more embodiments described herein. At FIGS. 6A-6C and 7A-7D, the fixed spacers 16 have respective densities at or below about 100 mm$^2$ and have an average dimension between the conductive substrates 15 (e.g., thickness between the conductive substrates 15) at or below about 20 μm. The spacers 16 are illustrated under parallel polarizer in FIGS. 6A-6C and under crossed polarizer in FIGS. 7A-7D. Effect of a parallel or crossed polarizer on aspects of an FLC element in accordance with one or more embodiments described herein will be described below in detail, such as relative to FIG. 1. It also will be appreciated that the understandings provided by and/or described relative to any of FIGS. 6A-6C and/or 7A-7D can be applied to the FLC element of any of FIGS. 2-5.

Figure 6A:
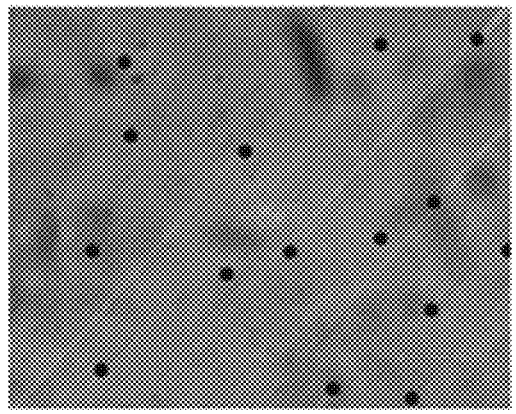
FIGS. 6A to 6C illustrate exemplary magnified views of three different embodiments of ferroelectric liquid crystal cells under parallel polarizer, showing only an internal portion of the cells, including a ferroelectric liquid crystal layer and a plurality of spacers, in accordance with one or more embodiments described herein.
Figure 6B:
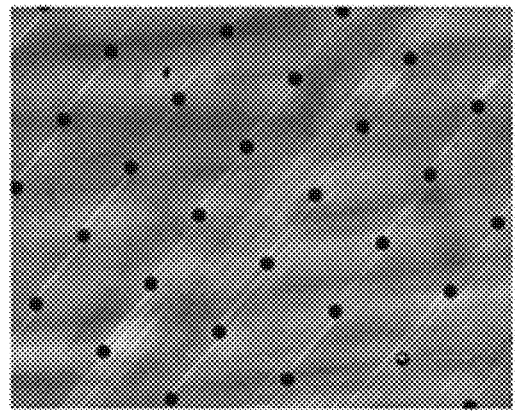
Figure 6C:
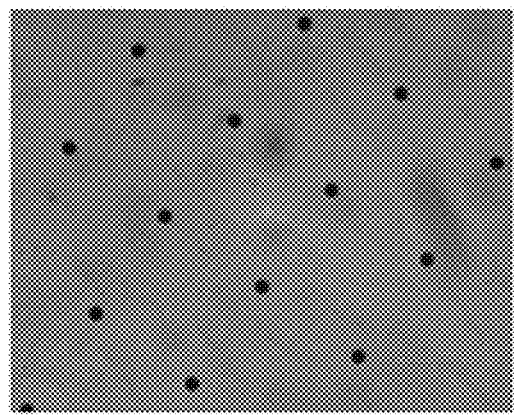

At FIG. 6A, arrangement of the spacers 16 is random. At FIG. 6B, arrangement of the spacers is periodic, with distance between spacers 16 (e.g., between spacers 16 that are closest to one another) at about 100 μm. At FIG. 6C, arrangement of the spacers is periodic, with distance between spacers 16 (e.g., between spacers 16 that are closest to one another) at about 150 μm.

At FIG. 7A, arrangement of the spacers is periodic, with distance between spacers 16 (e.g., between spacers 16 that are closest to one another) at about 150 μm. At FIG. 7B, arrangement of the spacers is periodic, with distance between spacers 16 (e.g., between spacers 16 that are closest to one another) at about 100 μm. At FIG. 7C, arrangement of the spacers is periodic, with distance between spacers 16 (e.g., between spacers 16 that are closest to one another) at about 50 μm. At FIG. 7D, arrangement of the spacers 16 is random.

In summary, according to the quality of alignment of molecular cells of the FLC layer provided by the spacings according to FIGS. 6A-6C and 7A-7C, best alignment quality can be acquired when the distance between spacers is at about 100 μm. Based upon quality of alignment of molecular cells of the FLC layer provided by the spacings according to FIGS. 7A-7D, production of defects, such as due to fringe field effect (FFE) can be worst at random arrangement of fixed spacers.

Turning now to the conductive substrates 15, such conductive substrates can be at least partially and/or fully transparent. In one embodiment, such as in the FLC element 10, one of the conductive substrates 15 can comprise glass and an electrode and the other conductive substrate 15 can comprise a mirror and an electrode. The mirror can be comprised of a suitable metal, such as aluminum and/or gold.

In one or more embodiments, an electrode pattern can be employed on at least one of the conductive substrates 15. Indeed, an FLC element having such electrode pattern can provide a small fringe field effect. For example, such electrode pattern can be employed with an FLC element implemented when employing an FLC element in a grating diffraction device. In such device, an electrode pattern can be employed on either one or both sides of one or both conductive substrates. In an embodiment, an electrode pattern can comprise a thin dielectric layer patterned with various and/or uniform thicknesses at or smaller than about 200 nm, such as about 150 nm or about 100 nm. Different electrode patterns and/or electrode thicknesses can be employed at different sides of a conductive substrate, and/or at different sides of different conductive substrates. An electrode pattern can comprise, for example, lines and/or squares with and/or without period. An electrode pattern can comprise a suitable conductive material such as ITO, Au and/or Ag. For ITO, the electrode pattern thickness can be about 160 nm and for metal, such as Au or Ag, the electrode pattern thickness can be about 20 nm.

It will be appreciated that in one or more alternative embodiments, an electrode pattern can be employed with and/or without one or more polarizers and/or wave plates.

Turning now to FIGS. 14A-14D and 15A-15D, exemplary polarizer optical diagrams are illustrated for FLC cells under cross polarizer (also herein referred to as crossed polarizer). It will be appreciated that effect of employment of a polarizer will be described below in detail, such as relative to FIG. 1.

Figure 14A:
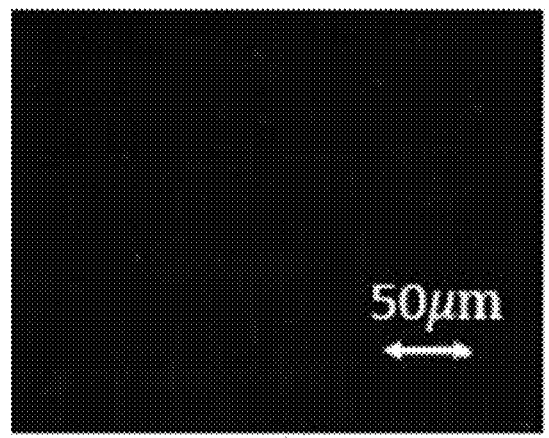
FIG. 14A illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 0 V is applied on each electrode line.

FIG. 14A illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 0 V is applied on each electrode line.

Figure 14B:
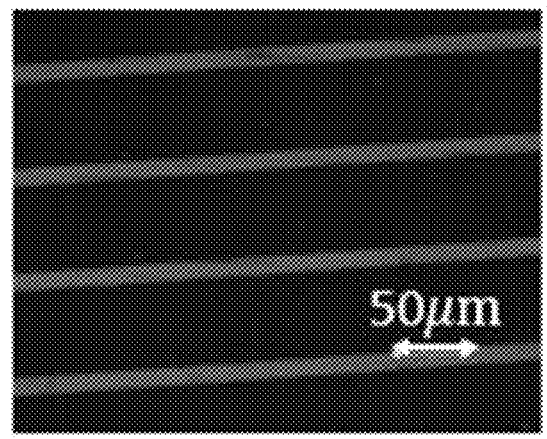
FIG. 14B illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 2 V is applied on each electrode line.

FIG. 14B illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 2 V is applied on each electrode line.

Figure 14C:
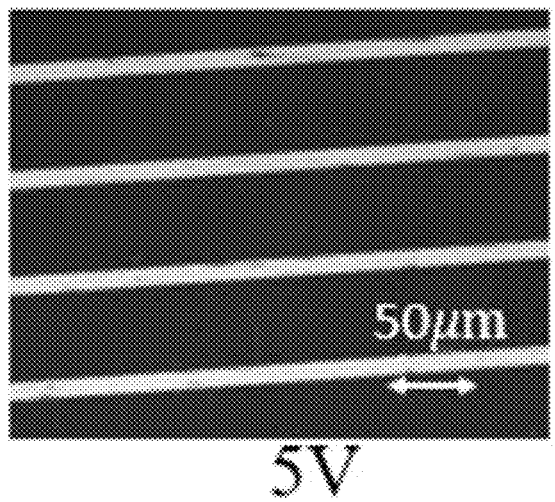
FIG. 14C illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 5 V is applied on each electrode line.

FIG. 14C illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 5 V is applied on each electrode line.

Figure 14D:
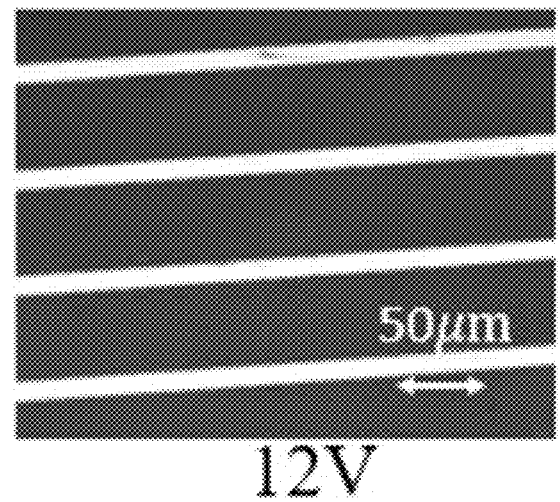
FIG. 14D illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 12 V is applied on each electrode line.

FIG. 14D illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 12 V is applied on each electrode line.

Figure 15A:
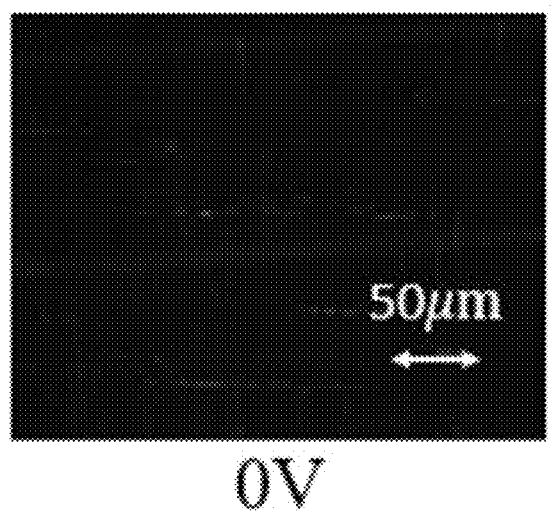
FIG. 15A illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 0 V is applied on septal electrode line.

FIG. 15A illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 0 V is applied on septal electrode line.

Figure 15B:
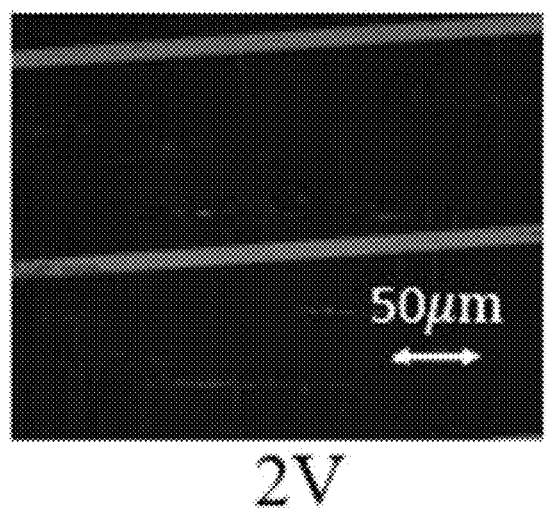
FIG. 15B illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 2 V is applied on septal electrode line.

FIG. 15B illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 2 V is applied on septal electrode line.

Figure 15C:
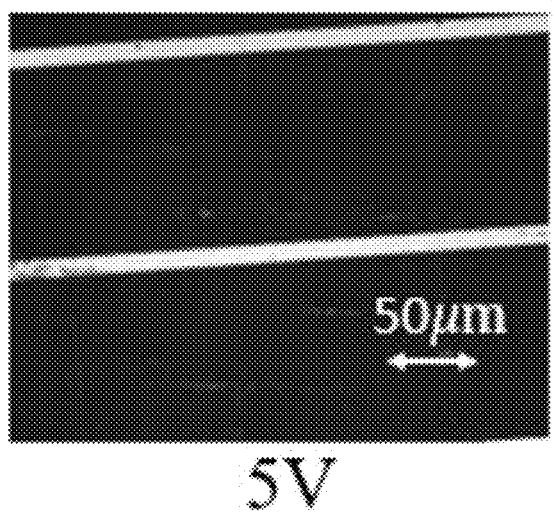
FIG. 15C illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 5 V is applied on septal electrode line.

FIG. 15C illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 5 V is applied on septal electrode line.

Figure 15D:
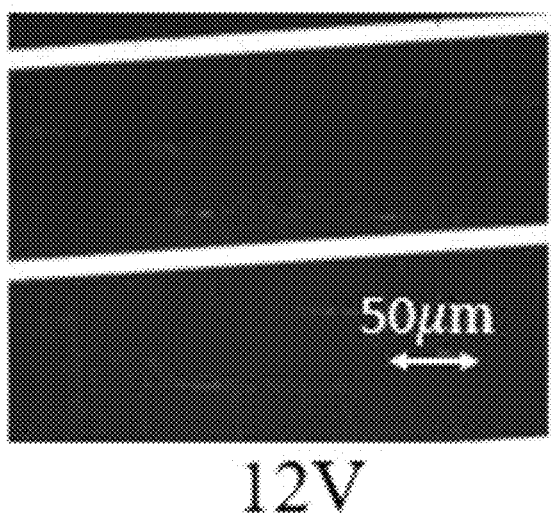
FIG. 15D illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 12 V is applied on septal electrode line.

FIG. 15D illustrates an exemplary polarizer optical diagram of an FLC grating, in accordance with one or more embodiments described herein, under cross polarizer. An in-plane-switching electrode pattern comprises an ITO electrode pattern on one conductive substrate of the FLC cell and a uniform electrode on the other conductive substrate of the FLC cell, and 12 V is applied on septal electrode line.

Turning now again to FIG. 1 and also to FIGS. 2 to 5, additional embodiments of FLC elements, which can facilitate suppression of fringe field effect relative to, for example, photonics and/or display purposes, are illustrated. Like element numbers are employed for like elements. It will be appreciated that one or more features, functions, physical properties and/or dimensions of one or more aspects of the FLC element 10 can be employed with and/or for one or more aspects of the FLC elements 20, 30, 40 and 50 illustrated at FIGS. 2 to 5.

As illustrated at FIG. 1, the conductive substrates 15, the FLC layer 12, one or more spacers 16 and the alignment layer 13 can further be disposed between a pair of polarizers 11 and 14. As provided in FIG. 1, φ0 is the direction of the polarizer on the bottom, the direction of the polarizer on the top is φ0+(Π/2), and d is the thickness of the ferroelectric liquid crystal which can be in the a from about 0.1 μm to about 100 μm. The polarizers 11 and/or 14 can have a thickness (e.g., in a direction of d) between about 0.1 nm and about 3.0 nm, although other larger thicknesses can be suitable in other embodiments. It will be appreciated that in another embodiment, the FLC element 10 of FIG. 1 can omit the pair of polarizers 11 and 14.

With respect to the polarizers 11 and 14, the polarizers can be parallel polarizers having a same direction or a crossed polarizers, such as having orthogonal directions relative to one another. A major helix direction of the FLC layer 12 can be arranged in a same direction as a polarizing direction of one of the polarizers. Alternatively, the FLC layer 12 can be arranged in a same direction as both of the polarizers, such as where both polarizers are of the same type (e.g., both being parallel or both being crossed). When a direction of the helix of the FLC layer 12 is parallel to one of the polarizers, dark state and bright state, respectively, can be achieved when there is no voltage applied for crossed polarizer or parallel polarizer, respectively. When voltage is applied, the helix can rotate and show amplitude modulation.

With respect to the FLC element 10 including the polarizers 11 and 14, a transmissive mode of or employing the FLC element 10 can provide low-voltage, fast-response binary phase modulation and/or continuous amplitude modulation for impinging light 17, with a voltage source for applying a driving voltage applied to the FLC element 10. As used herein, "fast" can refer to response time below about 1 ms including the switching on and off time. As used herein, "low" can refer to a driving voltage below about 10V. For continuous amplitude modulation, the driving voltage can change and/or be changed by an entity from about 0 V to about the respective unwinding voltage. For example, looking still to FIG. 1, a device 18, such as a photonics or display device, can employ the FLC element 10. A voltage source 19 can be employed to apply one or more different voltages to the FLC element 10.

Turning now to FIG. 2, the FLC element 20 can comprise a quarter-wave plate 24 and a single-side alignment layer 23 based on the photoalignment technique or rubbed polyimide technique. The wave plate 24 can have a thickness (e.g., in a direction of d) between about 0.1 μm and about 5.0 μm, although other larger thicknesses can be suitable in other embodiments. The conductive substrate 25B can comprise a mirror with electrode. The conductive substrate 25A can comprise glass with electrode. The quarter-wave plate 24 can be applied to control the direction of polarization light through and/or from the FLC element 20. One or more fixed spacers 26 can be employed with random and/or periodic arrangement between the conductive substrates 25A and 25B for cell gap maintenance for the FLC 22 also disposed between the conductive substrates 25A and 25B. A reflective mode of or employing the FLC element 20 can provide low-voltage, fast-response binary 2π phase modulation and/or continuous 2π phase modulation for circularly polarized impinging light 21, with a voltage source for applying a driving voltage to the ferroelectric liquid crystal cell. For continuous phase modulation, the driving voltage can change and/or be changed by an entity from about 0 V to about the respective unwinding voltage.

Turning now to FIG. 3, the FLC element 30 can comprise a half-wave plate 34 and a single-side alignment layer 33 based on a photoalignment technique or rubbed polyimide technique on one conductive substrate 35B, which can comprise of glass with electrode. Another conductive substrate 35A can comprise glass with electrode. The half-wave plate 34 can be applied to control the direction of polarization light through and/or from the FLC element 30. One or more fixed spacers 36 can be employed with random and/or periodic arrangement between the conductive substrates 35A and 35B for cell gap maintenance for the FLC layer 32 also disposed between the conductive substrates 35A and 35B. A transmissive mode of or employing the FLC element 30 can provide low-voltage fast-response binary 2π phase modulation and/or continuous 2π phase modulation for the circularly polarized impinging and output light 31, with a voltage source for applying a driving voltage to the FLC element 30. For continuous phase modulation, the driving voltage can change and/or be changed by an entity from about 0 V to about the respective unwinding voltage.

Turning now to FIG. 4, the FLC element 40 can comprise a quarter-wave plate 44 and a single-side alignment layer 43 based on a photoalignment technique or a rubbed polyimide technique on one conductive substrate 45B, which can be comprised of mirror with electrode. Another conductive substrate 45A is glass with electrode. The mirror can be comprised of a suitable metal, such as aluminum and/or gold. It will be appreciated that in one or more other embodiments, the alignment layer 43 instead can be comprised on the conductive substrate 45A.

A circular polarizer 41 can be placed on top of (e.g., on, against, and/or contiguous with) one conductive substrate the substrate. The quarter-wave plate 44 can be used to control the direction of polarization light through and/or from the FLC element 40. One or more fixed spacers 47 can be employed with random and/or periodic arrangement between the conductive substrates 45A and 45B for cell gap maintenance for the FLC layer 42 that also is disposed between the conductive substrates 45A and 45B. A reflective mode of or employing the FLC element 40 can provide low-voltage, fast-response binary phase modulation and/or continuous amplitude modulation for impinging light 47, with a voltage source for applying a driving voltage to the FLC element 40. For continuous amplitude modulation, the driving voltage can change and/or be changed by an entity from about 0 V to about the respective unwinding voltage.

Turning now to FIG. 5, the FLC element 50 can comprise two transparent conductive substrates 54 and one of them can be coated with an alignment layer 53 based on the photoalignment technique or rubbed polyimide technique. One or more fixed spacers 55 can be employed with random and/or periodic arrangement between the conductive substrates 55 for cell gap maintenance for the FLC layer 52 that also is disposed between the conductive substrates 55. A transmissive mode of or employing the FLC element 50 can provide low-voltage, fast-response binary phase modulation and/or continuous phase modulation for the circularly polarized impinging light 51, with a voltage source for applying a driving voltage to the FLC element 50. For continuous phase modulation, the driving voltage can change and/or be changed by an entity from about 0 V to about the respective unwinding voltage.

Relative now to one or more additional embodiments, it will be appreciated that one or more polarizers, e.g., of a parallel type, crossed, type, or both types, can be employed in combination with a wave plate, such as a half-wave plate or a quarter-wave plate. Any combination thereof can be employed in a device, such as a continuous amplitude modulation device or a continuous phase modulation device. That is, it will be appreciated that one having ordinary skill of the art will understand the below-described embodiments, absent each and every possible combination of aspects and/or components of a suitable FLC element, in accordance with one or more embodiments described herein, being particularly and/or separately illustrated.

For example, in an embodiment, a continuous amplitude modulation device can comprise a pair of quarter-wave plates, a pair of crossed polarizers, and an FLC cell (e.g., FLC element 10 of FIG. 1) disposed between the two polarizers, and with a helix direction of the respective FLC layer (e.g., FLC layer 12) being in the same direction as one of the two polarizers. A voltage source can be applied for driving voltage to the FLC element. As such, a fast-response amplitude modulation can result for impinging light and/or a fast-response binary amplitude modulation can result for impinging light. As used herein, the term "fast" can refer to a response time at or below about 1 ms, including the switching on and off time.

For example, in another embodiment, a continuous amplitude modulation device can comprise a pair of half-wave plates, a pair of crossed polarizers, and an FLC cell (e.g., FLC element 10 of FIG. 1) disposed between the two polarizers, and with a helix direction of the respective FLC layer (e.g., FLC layer 12) being in the same direction as one of the two polarizers. A voltage source can be applied for driving voltage to the FLC element. As such, a fast-response continuous amplitude modulation can result for impinging light and/or a fast-response binary amplitude modulation can result for impinging light.

For example, in still another embodiment, a continuous phase modulation device can comprise a pair of quarter-wave plates, a pair of parallel polarizers, and an FLC cell (e.g., FLC element 10 of FIG. 1) disposed between the two polarizers, and with a helix direction of the respective FLC layer (e.g., FLC layer 12) being in the same direction as one of the two polarizers. A voltage source can be applied for driving voltage to the FLC element. As such, a continuous amplitude modulation can result for impinging light and/or a fast-response binary amplitude modulation can result for impinging light.

For example, in yet another embodiment, a continuous phase modulation device can comprise a pair of half-wave plates, a pair of parallel polarizers, and an FLC cell (e.g., FLC element 10 of FIG. 1) disposed between the two polarizers, and with a helix direction of the respective FLC layer (e.g., FLC layer 12) being in the same direction as one of the two polarizers. A voltage source can be applied for driving voltage to the FLC element. As such, a fast-response continuous phase modulation can result for impinging light and/or a fast-response binary amplitude modulation can result for impinging light.

In summary, the one or more embodiments of one or more FLC elements described herein can provide one or more of high optical contrast, minimal or no fringe field, fast response, low driving voltages, minimal or no intrinsic diffraction and/or ease of fabrication. Moreover, when employing a wave plate, such as a quarter-wave plate or a half-wave plate with and/or as part of an FLC element in accordance with one or more embodiments described herein, a continuous phase modulation can be achieved. As such, the one or more embodiments of an FLC element described herein can be suitable for employment in high-resolution display and/or photonics devices, systems, methods and/or apparatuses.

Exemplary Results

With respect to each of the FIGS. 1 to 5, a response time for the illustrated FLC cell(s) can be on the order of about µs with low voltage driving, such as below about 10V. Relative to the respective alignment layers 13, 23, 33, 43 and/or 53, the anchoring energy on a single conductive substrate 15, 25, 25B, 35A, 35B, 45A, 45B and/or 55 can range from about $10^{-5}$ to about $10^{-3}$ J/m$^2$.

Turning now to FIGS. 10A, 10B, 11A and 11B, graphs of exemplary waveforms of various FLC elements, in accordance with one or more embodiments described herein, such as the embodiments of FIGS. 1 and 4, are illustrated, as driven by defined corresponding waves.

Figure 10B:
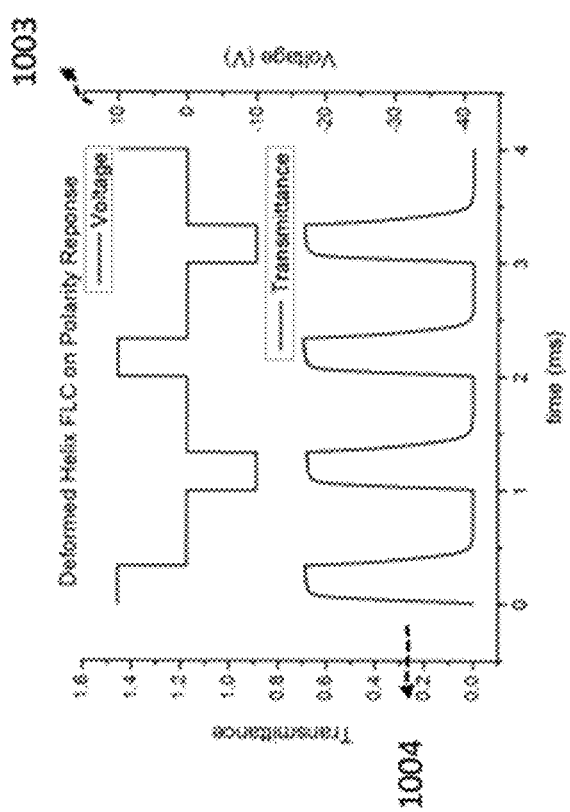
FIG. 10B illustrates a graph of a polarity response waveform of a DHFLC cell driven by a corresponding wave, in accordance with one or more embodiments described herein.
Figure 10A:
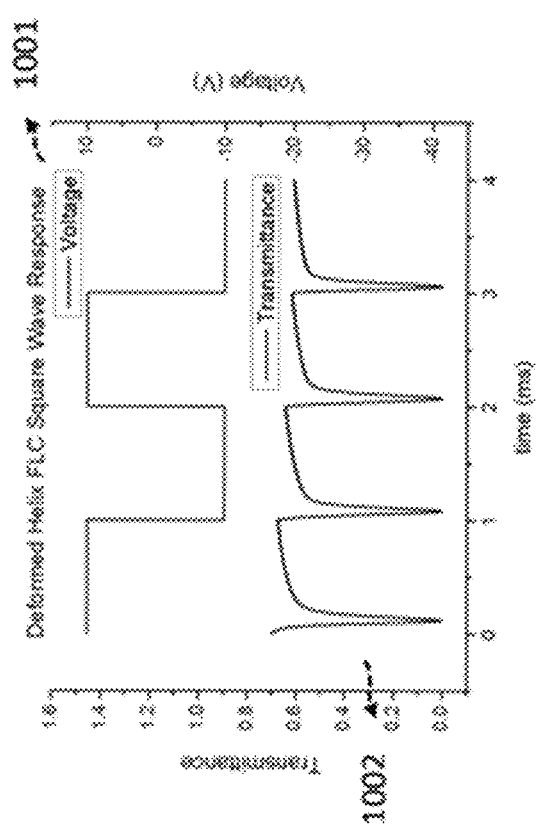
FIG. 10A illustrates a graph of a response waveform of a DHFLC cell driven by a square wave, in accordance with one or more embodiments described herein.

FIG. 10A illustrates a graph of a response waveform 1002 of a DHFLC cell driven by a square wave 1001, in accordance with one or more embodiments described herein.

FIG. 10B illustrates a graph of a polarity response waveform 1004 of a DHFLC cell driven by a corresponding wave 1003, in accordance with one or more embodiments described herein.

Figure 11B:
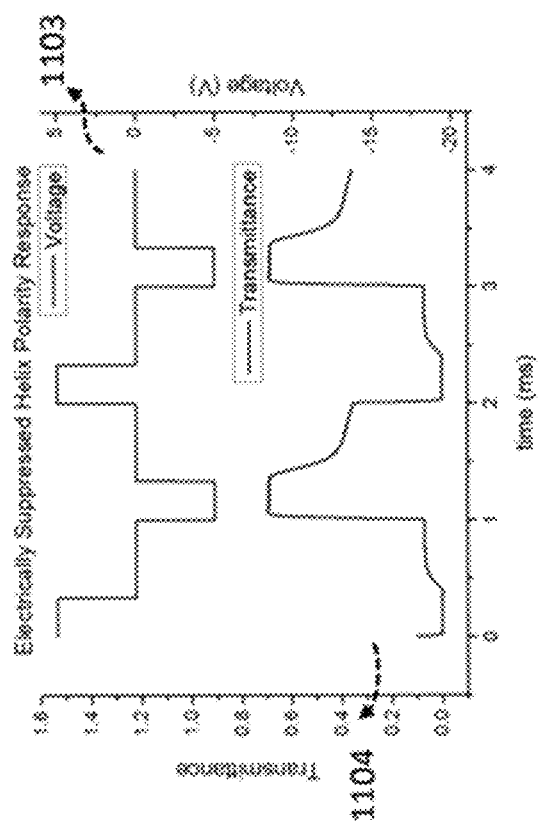
FIG. 11B illustrates a graph of a polarity response waveform of an ESHFLC cell driven by a corresponding wave, in accordance with one or more embodiments described herein.
Figure 11A:
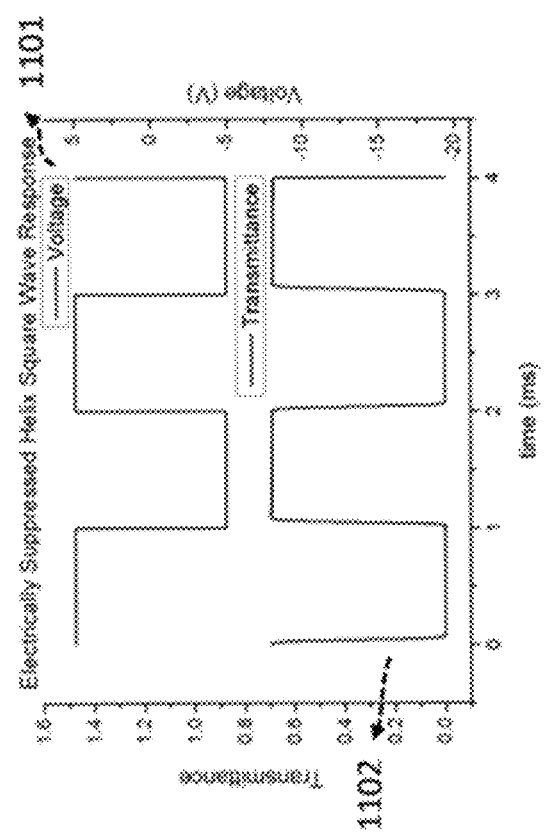
FIG. 11A illustrates a graph of a response waveform of an ESHFLC cell driven by a square wave, in accordance with one or more embodiments described herein.

FIG. 11A illustrates a graph of a response waveform 1102 of an ESHFLC cell driven by a square wave 1101, in accordance with one or more embodiments described herein.

FIG. 11B illustrates a graph of a polarity response waveform 1104 of an ESHFLC cell driven by a square wave 1103, in accordance with one or more embodiments described herein.

Figure 13:
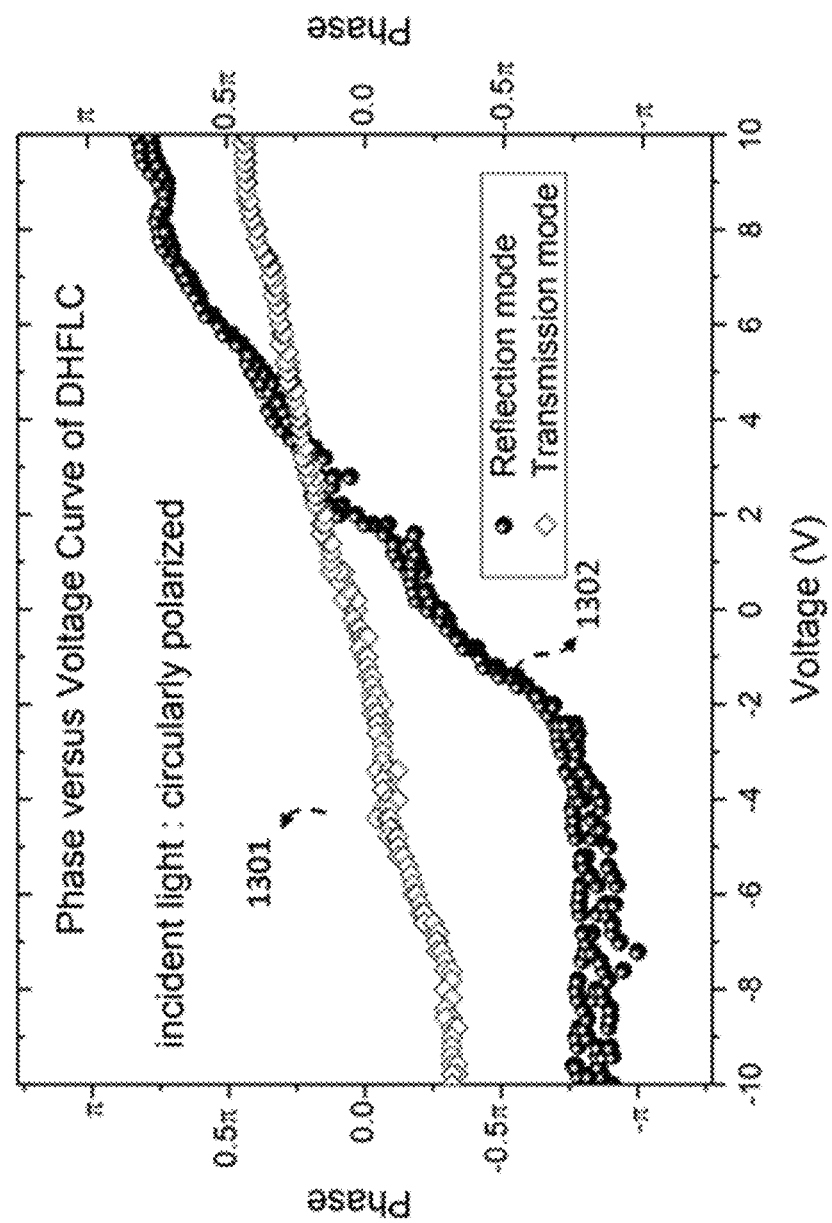
FIG. 13 illustrates a graph showing a relationship of phase variance versus voltage for a DHFLC cell at 632 nm wavelength, in accordance with one or more embodiments described herein. Light incident on/at the DHFLC cell is circularly polarized light. The performance for a transmission mode 1301 and for a reflection mode 1302 are compared.

Turning now to FIG. 13, an additional graph is illustrated, in accordance with one or more embodiments described herein, such as the embodiments of FIGS. 2, 3 and 5. Illustrated at FIG. 13 is a graph showing a relationship of phase variance versus voltage for a DHFLC cell at 632 nm wavelength, in accordance with one or more embodiments described herein. Light incident on/at the DHFLC cell is circularly polarized light. The performance for a transmission mode 1301 and for a reflection mode 1302 are compared. The phase modulation can be measured by interferometer. In the transmission mode, the phase modulation range can be about 0.82pi and the phase modulation range in reflection mode can be about 1.65pi. Thus, a difference between the transmission mode and reflective mode can be the modulation range. In principle, the transmission mode can only achieve pi phase modulation but in reflective mode, 2p phase modulation can be achieved.

Example Method of Manufacture

Figure 16:
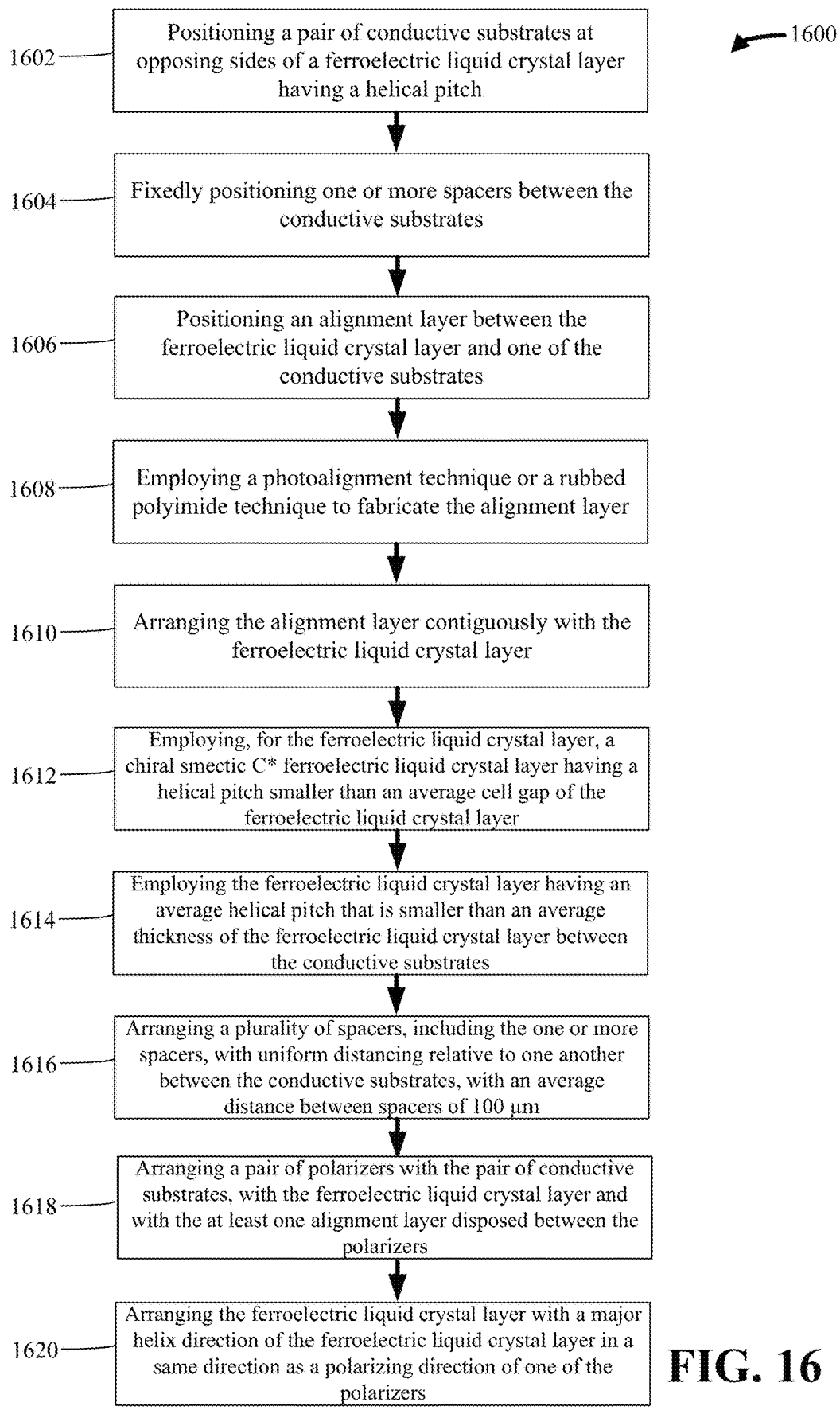
FIG. 16 illustrates a flow diagram, of an example, non-limiting method for producing an FLC cell, in accordance with one or more embodiments described herein.

Turning now to FIG. 16, illustrated is a flow diagram of an example, non-limiting method 1600 that can facilitate a process for manufacturing a FLC element, such as the FLC element 10. It will be appreciated that while the method 1600 is described relative to the FLC element 10, the method 1600 can be applicable also to any of the FLC elements 20, 30, 40 and/or 50, and/or other embodiments described herein but not particularly illustrated. Repetitive description of like elements and/or processes employed in respective embodiments is omitted for sake of brevity.

Looking first to operation 1602 at FIG. 16, the method 1600 can comprise positioning a pair of conductive substrates (e.g., conductive substrates 15) at opposing sides of a ferroelectric liquid crystal layer (e.g., FLC 12) having a helical pitch.

At operation 1604, the method 1600 can comprise fixedly positioning one or more spacers (e.g., one or more spacers 16) between the conductive substrates (e.g., conductive substrates 15).

At operation 1606, the method 1600 can comprise positioning an alignment layer (e.g., alignment layer 13) between the ferroelectric liquid crystal layer (e.g., FLC 12) and one of the conductive substrates (e.g., conductive substrates 15).

At operation 1608, the method 1600 can comprise employing a photoalignment technique or a rubbed polyimide technique to fabricate the alignment layer (e.g., alignment layer 13).

At operation 1610, the method 1600 can comprise arranging the alignment layer (e.g., alignment layer 13) contiguously with the ferroelectric liquid crystal layer (e.g., FLC 12).

At operation 1612, the method 1600 can comprise employing, for the ferroelectric liquid crystal layer (e.g., FLC 12), a chiral smectic C* ferroelectric liquid crystal layer (e.g., FLC 12) having a helical pitch smaller than an average cell gap of the ferroelectric liquid crystal layer (e.g., FLC 12).

At operation 1614, the method 1600 can comprise employing the ferroelectric liquid crystal layer (e.g., FLC 12) having an average helical pitch that is smaller than an average thickness of the ferroelectric liquid crystal layer (e.g., FLC 12) between the conductive substrates (e.g., conductive substrates 15).

At operation 1616, the method 1600 can comprise arranging a plurality of spacers, including the one or more spacers (e.g., one or more spacers 16), with uniform distancing relative to one another between the conductive substrates (e.g., conductive substrates 15), with an average distance between spacers (e.g., one or more spacers 16) of 100 μm.

At operation 1618, the method 1600 can comprise arranging a pair of polarizers (e.g., polarizers 11 and 14) with the pair of conductive substrates (e.g., conductive substrates 15), with the ferroelectric liquid crystal layer (e.g., FLC 12) and with the at least one alignment layer (e.g., alignment layer 13) disposed between the polarizers (e.g., polarizers 11 and 14).

At operation 1620, the method 1600 can comprise arranging the ferroelectric liquid crystal layer (e.g., FLC 12) with a major helix direction of the ferroelectric liquid crystal layer (e.g., FLC 12) in a same direction as a polarizing direction of one of the polarizers (e.g., polarizers 11 and 14).

Example Method of Use

Figure 17:
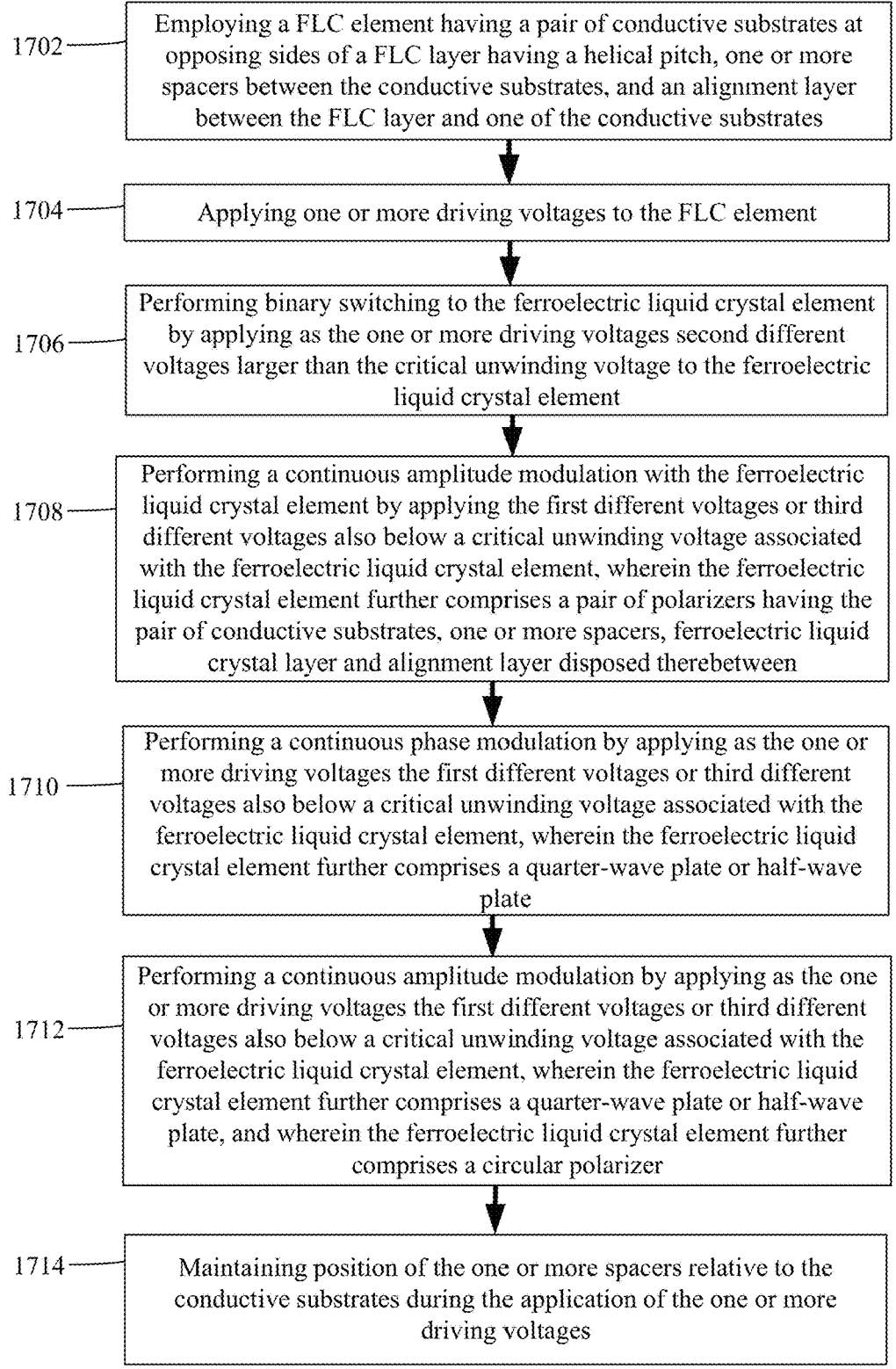
FIG. 17 illustrates a flow diagram, of an example, non-limiting method for employing an FLC cell, in accordance with one or more embodiments described herein.

Turning now to FIG. 17, illustrated is a flow diagram of an example, non-limiting method 1700 that can facilitate a process for using a FLC element, such as the FLC element 10, in a device, component, system and/or apparatus, such as for a display and/or photonics purpose. It will be appreciated that while the non-limiting method 1700 is described relative to one or more of the FLC elements 10, 20, 30, 40 or 50, the non-limiting method 1700 can be applicable to any of the FLC elements 10, 20, 30, 40 and/or 50, and/or other embodiments described herein but not particularly illustrated. Repetitive description of like elements and/or processes employed in respective embodiments is omitted for sake of brevity.

Looking first to operation 1702 at FIG. 17, the non-limiting method 1700 can comprise employing a ferroelectric liquid crystal element (e.g., FLC element 10, 20, 30, 40 or 50) having one or more spacers fixedly positioned between a pair of conductive substrates at opposing sides of a ferroelectric liquid crystal layer having a helical pitch, and an alignment layer between the ferroelectric liquid crystal layer and one of the conductive substrates.

At operation 1704, the non-limiting method 1700 can comprise applying one or more driving voltages to the ferroelectric liquid crystal element (e.g., FLC element 10, 20, 30, 40 or 50).

At operation 1706, the non-limiting method 1700 can comprise performing binary switching to the ferroelectric liquid crystal element (e.g., FLC element 10, 20, 30, 40 or 50) by applying as the one or more driving voltages second different voltages larger than the critical unwinding voltage to the ferroelectric liquid crystal element.

At operation 1708, the non-limiting method 1700 can comprise performing a continuous amplitude modulation with the ferroelectric liquid crystal element (e.g., FLC element 10) by applying the first different voltages or third different voltages also below a critical unwinding voltage associated with the ferroelectric liquid crystal element, wherein the ferroelectric liquid crystal element further comprises a pair of polarizers having the pair of conductive substrates, one or more spacers, ferroelectric liquid crystal layer and alignment layer disposed therebetween.

At operation 1710, the non-limiting method 1700 can comprise performing a continuous phase modulation by applying as the one or more driving voltages the first different voltages or third different voltages also below a critical unwinding voltage associated with the ferroelectric liquid crystal element (e.g., FLC element 20, 30 or 40), wherein the ferroelectric liquid crystal element further comprises a quarter-wave plate or half-wave plate.

At operation 1712, the non-limiting method 1700 can comprise performing a continuous amplitude modulation with the ferroelectric liquid crystal element (e.g., FLC element 40) by applying as the one or more driving voltages the first different voltages or third different voltages also below a critical unwinding voltage associated with the ferroelectric liquid crystal element, wherein the ferroelectric liquid crystal element further comprises a quarter-wave plate or half-wave plate, and wherein the ferroelectric liquid crystal element further comprises a circular polarizer.

At operation 1714, the non-limiting method 1700 can comprise, regarding the ferroelectric liquid crystal element (e.g., FLC element 10, 20, 30, 40 or 50), maintaining position of the one or more spacers relative to the conductive substrates during the application of the one or more driving voltages.

CONCLUSION

For simplicity of explanation, the methodologies provided herein are depicted and/or described as a series of acts. It is to be understood and appreciated that the subject innovation is not limited by the acts illustrated and/or by the order of acts, for example acts can occur in one or more orders and/or concurrently, and with other acts not presented and described herein. Furthermore, not all illustrated acts can be utilized to implement the methodologies in accordance with the described subject matter. In addition, those skilled in the art will understand and appreciate that the methodologies could alternatively be represented as a series of interrelated states via a state diagram or events.

The systems and/or devices have been (and/or will be further) described herein with respect to interaction between one or more components. It should be appreciated that such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

The word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for producing a ferroelectric liquid crystal element, the method comprising:
    positioning a pair of conductive substrates at opposing sides of a ferroelectric liquid crystal layer having a helical pitch;
    fixedly positioning one or more spacers between the conductive substrates;
    positioning an alignment layer between the ferroelectric liquid crystal layer and one of the conductive substrates;
    arranging, with the ferroelectric liquid crystal layer, a quarter-wave plate or a half-wave plate;
    modulating a transmittance associated with the ferroelectric liquid crystal element by applying, as one or more driving voltages, first different voltages below a critical unwinding voltage associated with the ferroelectric liquid crystal element; and
    performing a continuous phase modulation by applying, as the one or more driving voltages to the ferroelectric liquid crystal layer, the first different voltages or second different voltages below a critical unwinding voltage associated with the ferroelectric liquid crystal element.

2. The method of claim 1, further comprising:
    employing a photoalignment technique or a rubbed polyimide technique to fabricate the alignment layer, and wherein the conductive substrates are transparent, and wherein one of the conductive substrates comprises glass and an electrode and the other conductive substrate comprises a mirror and an electrode.

3. The method of claim 1, further comprising:
    employing, for the ferroelectric liquid crystal layer, a chiral smectic C* ferroelectric liquid crystal layer having a helical pitch smaller than an average cell gap of the ferroelectric liquid crystal layer or having an average helical pitch that is smaller than an average thickness of the ferroelectric liquid crystal layer between the conductive substrates.

4. The method of claim 1, further comprising:
    arranging a plurality of spacers, including the one or more spacers, with uniform distancing relative to one another between the conductive substrates, with an average distance between spacers of 100 μm.

5. The method of claim 1, further comprising:
    arranging the ferroelectric liquid crystal layer with a major helix direction of the ferroelectric liquid crystal layer in a same direction as a polarizing direction of one of the polarizers.

6. The method of claim 1, further comprising:
    arranging a pair of polarizers with the pair of conductive substrates, with the ferroelectric liquid crystal layer and with the at least one alignment layer disposed between the polarizers.

7. The method of claim 6, wherein at least one polarizer of the pair of polarizers is a circular polarizer.

8. A method, comprising:
applying one or more driving voltages to a ferroelectric liquid crystal element, wherein the ferroelectric liquid crystal element comprises one or more spacers fixedly positioned between a pair of conductive substrates at opposing sides of a ferroelectric liquid crystal layer having a helical pitch, and an alignment layer between the ferroelectric liquid crystal layer and one of the conductive substrates;
modulating a transmittance associated with the ferroelectric liquid crystal element by applying, as the one or more driving voltages, first different voltages below a critical unwinding voltage associated with the ferroelectric liquid crystal element; and
performing a continuous phase modulation by applying, as the one or more driving voltages, the first different voltages or second different voltages also below the critical unwinding voltage associated with the ferroelectric liquid crystal element, wherein the ferroelectric liquid crystal element further comprises a quarter-wave plate or a half-wave plate.

9. The method of claim 8, further comprising:
performing binary switching to the ferroelectric liquid crystal element by applying, as the one or more driving voltages, third different voltages larger than the critical unwinding voltage to the ferroelectric liquid crystal element.

10. The method of claim 8,
wherein the ferroelectric liquid crystal element further comprises a pair of polarizers comprising the pair of conductive substrates, the one or more spacers, the ferroelectric liquid crystal layer and the alignment layer.

11. The method of claim 10, wherein a major helix direction of the ferroelectric liquid crystal layer is arranged in a same direction as a polarizing direction of one of the polarizers.

12. The method of claim 8, further comprising:
performing a continuous amplitude modulation with the ferroelectric liquid crystal element by applying, as the one or more driving voltages, the first different voltages or third different voltages also below the critical unwinding voltage associated with the ferroelectric liquid crystal element.

13. The method of claim 12, wherein the ferroelectric liquid crystal element further comprises a circular polarizer.

14. The method of claim 8, further comprising:
maintaining a position of the one or more spacers relative to the conductive substrates during application of the one or more driving voltages.

15. The method of claim 8, wherein an average helical pitch of the ferroelectric liquid crystal layer is smaller than an average thickness of the ferroelectric liquid crystal layer between the conductive substrates.

16. The method of claim 8, wherein the ferroelectric liquid crystal element further comprises a plurality of spacers comprising the one or more spacers, and wherein arrangement of the plurality of spacers employs uniform distancing relative to one another between the conductive substrates, with an average distance between spacers of at least 100 μm.

17. The method of claim 8, wherein the one or more spacers have respective densities at or below 80 $mm^{-2}$.

18. A method, comprising:
applying one or more driving voltages to a ferroelectric liquid crystal element, wherein the ferroelectric liquid crystal element comprises one or more spacers fixedly positioned between a pair of conductive substrates at opposing sides of a ferroelectric liquid crystal layer having a helical pitch, and an alignment layer between the ferroelectric liquid crystal layer and one of the conductive substrates;
modulating a transmittance associated with the ferroelectric liquid crystal element by applying, as the one or more driving voltages, first different voltages below a critical unwinding voltage associated with the ferroelectric liquid crystal element; and
performing a continuous amplitude modulation with the ferroelectric liquid crystal element by applying, as the one or more driving voltages, the first different voltages or second different voltages also below the critical unwinding voltage associated with the ferroelectric liquid crystal element, wherein the ferroelectric liquid crystal element further comprises a quarter-wave plate or a half-wave plate, and wherein the ferroelectric liquid crystal element further comprises a circular polarizer.

19. The method of claim 18, further comprising:
performing binary switching to the ferroelectric liquid crystal element by applying, as the one or more driving voltages, third different voltages larger than the critical unwinding voltage to the ferroelectric liquid crystal element.

20. The method of claim 18, wherein the ferroelectric liquid crystal element further comprises a pair of polarizers comprising the pair of conductive substrates, the one or more spacers, the ferroelectric liquid crystal layer and the alignment layer.

\* \* \* \* \*